(12) United States Patent  
Balasubramanian et al.

(10) Patent No.: US 12,413,396 B2
(45) Date of Patent: Sep. 9, 2025

(54) LOWER LAYER SECURITY FOR GROUPCAST COMMUNICATION

(71) Applicant: QUALCOMM Incorporated, San Diego, CA (US)

(72) Inventors: Anantharaman Balasubramanian, San Diego, CA (US); Karthika Paladugu, San Diego, CA (US); Hong Cheng, Basking Ridge, NJ (US); Shuanshuan Wu, San Diego, CA (US); Junyi Li, Fairless Hills, PA (US); Kapil Gulati, Belle Mead, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 31 days.

(21) Appl. No.: 17/649,755

(22) Filed: Feb. 2, 2022

(65) Prior Publication Data

US 2023/0246823 A1    Aug. 3, 2023

(51) Int. Cl.
*H04L 9/08* (2006.01)
*H04L 9/32* (2006.01)
*H04L 9/40* (2022.01)

(52) U.S. Cl.
CPC .......... *H04L 9/0833* (2013.01); *H04L 9/3242* (2013.01); *H04L 9/3268* (2013.01); *H04L 9/40* (2022.05)

(58) Field of Classification Search
CPC ................ H04L 9/0833; H04L 9/3242; H04L 9/3268; H04L 9/40; H04L 9/0866; H04L 63/065; H04L 2209/80; H04W 12/04; H04W 12/106; H04W 12/76
See application file for complete search history.

(56) References Cited

U.S. PATENT DOCUMENTS

| | | | | |
|---|---|---|---|---|
| 7,848,518 B2 * | 12/2010 | Hars | ..................... | H04L 9/0891 369/30.58 |
| 11,751,062 B1 * | 9/2023 | de Haas | ................ | H04W 12/50 455/411 |
| 2005/0141706 A1 * | 6/2005 | Regli | .................... | H04L 9/0836 713/151 |
| 2009/0181643 A1 * | 7/2009 | Thakare | ................ | H04W 12/06 455/411 |
| 2012/0177198 A1 * | 7/2012 | Cabos | ................. | H04L 63/0428 380/270 |
| 2016/0218866 A1 * | 7/2016 | Patil | .................... | H04W 12/041 |
| 2018/0227282 A1 * | 8/2018 | Lee | ........................ | H04W 12/10 |
| 2018/0227752 A1 * | 8/2018 | Teyeb | ................... | H04W 12/06 |
| 2019/0260464 A1 * | 8/2019 | Roy | ................... | H04B 7/18563 |
| 2019/0356565 A1 * | 11/2019 | Zeng | ........................ | H04L 43/14 |
| 2019/0387401 A1 * | 12/2019 | Liao | .................... | H04W 28/0289 |
| 2020/0211301 A1 * | 7/2020 | Zhang | ................... | H04L 63/065 |
| 2021/0083842 A1 * | 3/2021 | Cugi | ................... | H04N 21/4408 |
| 2021/0092603 A1 * | 3/2021 | Yang | ..................... | H04L 9/0822 |
| 2022/0046114 A1 * | 2/2022 | Entelis | .................... | H04L 12/40 |
| 2022/0132603 A1 * | 4/2022 | Adjakple | .............. | H04W 8/005 |
| 2022/0191043 A1 * | 6/2022 | Ying | .................... | H04L 9/0869 |
| 2023/0073658 A1 * | 3/2023 | Fu | ........................ | H04L 63/083 |

* cited by examiner

*Primary Examiner* — Hany S. Gadalla
(74) *Attorney, Agent, or Firm* — Harrity & Harrity, LLP

(57) ABSTRACT

Various aspects of the present disclosure generally relate to wireless communication. In some aspects, a user equipment (UE) may obtain a common key. The UE may communicate with one or more other UEs using a lower layer groupcast key that is based at least in part on the common key, a parameter, and at least one of a group identifier or a destination identifier. Numerous other aspects are described.

30 Claims, 12 Drawing Sheets

LOWER LAYER SECURITY FOR GROUPCAST COMMUNICATION

FIELD OF THE DISCLOSURE

Aspects of the present disclosure generally relate to wireless communication and to techniques and apparatuses for lower layer security for groupcast communication.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include obtaining a common key. The method may include communicating with one or more other UEs using a lower layer groupcast key that is based at least in part on the common key, a parameter, and at least one of a group identifier or a destination identifier.

Some aspects described herein relate to a method of wireless communication performed by a relay UE. The method may include obtaining a first unicast key, from a first receiver UE, and a second unicast key, from a second receiver UE. The method may include transmitting, to the first receiver UE, a first communication that is based at least in part on a lower layer groupcast key and the first unicast key. The method may include transmitting, to the second receiver UE, a second communication that is based at least in part on the lower layer groupcast key and the second unicast key.

Some aspects described herein relate to a method of wireless communication performed by a receiver UE. The method may include transmitting, to a relay UE, a unicast key associated with the receiver UE. The method may include receiving, from the relay UE, a communication that is based at least in part on the unicast key and a lower layer groupcast key associated with a plurality of receiver UEs that includes the receiver UE.

Some aspects described herein relate to an apparatus for wireless communication performed by a UE. The apparatus may include a memory and one or more processors, coupled to the memory. The one or more processors may be configured to obtain a common key. The one or more processors may be configured to communicate with one or more other UEs using a lower layer groupcast key that is based at least in part on the common key, a parameter, and at least one of a group identifier or a destination identifier.

Some aspects described herein relate to an apparatus for wireless communication performed by a relay UE. The apparatus may include a memory and one or more processors, coupled to the memory. The one or more processors may be configured to obtain a first unicast key, from a first receiver UE, and a second unicast key, from a second receiver UE. The one or more processors may be configured to transmit, to the first receiver UE, a first communication that is based at least in part on a lower layer groupcast key and the first unicast key. The one or more processors may be configured to transmit, to the second receiver UE, a second communication that is based at least in part on the lower layer groupcast key and the second unicast key.

Some aspects described herein relate to an apparatus for wireless communication performed by a receiver UE. The apparatus may include a memory and one or more processors, coupled to the memory. The one or more processors may be configured to transmit, to a relay UE, a unicast key associated with the receiver UE. The one or more processors may be configured to receive, from the relay UE, a communication that is based at least in part on the unicast key and a lower layer groupcast key associated with a plurality of receiver UEs that includes the receiver UE.

Some aspects described herein relate to a non-transitory computer-readable medium that stores a set of instructions for wireless communication by a UE. The set of instructions, when executed by one or more processors of the UE, may cause the UE to obtain a common key. The set of instructions, when executed by one or more processors of the UE, may cause the UE to communicate with one or more other UEs using a lower layer groupcast key that is based at least in part on the common key, a parameter, and at least one of a group identifier or a destination identifier.

Some aspects described herein relate to a non-transitory computer-readable medium that stores a set of instructions for wireless communication by a relay UE. The set of instructions, when executed by one or more processors of the UE, may cause the UE to obtain a first unicast key, from a first receiver UE, and a second unicast key, from a second receiver UE. The set of instructions, when executed by one or more processors of the UE, may cause the UE to transmit, to the first receiver UE, a first communication that is based at least in part on a lower layer groupcast key and the first unicast key. The set of instructions, when executed by one or more processors of the UE, may cause the UE to transmit, to the second receiver UE, a second communication that is based at least in part on the lower layer groupcast key and the second unicast key.

Some aspects described herein relate to a non-transitory computer-readable medium that stores a set of instructions for wireless communication by a receiver UE. The set of instructions, when executed by one or more processors of the UE, may cause the UE to transmit, to a relay UE, a unicast key associated with the receiver UE. The set of instructions, when executed by one or more processors of the UE, may cause the UE to receive, from the relay UE, a communication that is based at least in part on the unicast key and a lower layer groupcast key associated with a plurality of receiver UEs that includes the receiver UE.

Some aspects described herein relate to an apparatus for wireless communication. The apparatus may include means for obtaining a common key. The apparatus may include means for communicating with one or more UEs using a lower layer groupcast key that is based at least in part on the common key, a parameter, and at least one of a group identifier or a destination identifier.

Some aspects described herein relate to an apparatus for wireless communication. The apparatus may include means for obtaining a first unicast key, from a first receiver UE, and a second unicast key, from a second receiver UE. The apparatus may include means for transmitting, to the first receiver UE, a first communication that is based at least in part on a lower layer groupcast key and the first unicast key. The apparatus may include means for transmitting, to the second receiver UE, a second communication that is based at least in part on the lower layer groupcast key and the second unicast key.

Some aspects described herein relate to an apparatus for wireless communication. The apparatus may include means for transmitting, to a relay UE, a unicast key associated with a receiver UE. The apparatus may include means for receiving, from the relay UE, a communication that is based at least in part on the unicast key and a lower layer groupcast key associated with a plurality of receiver UEs that includes the receiver UE.

Aspects generally include a method, apparatus, system, computer program product, non-transitory computer-readable medium, user equipment, base station, wireless communication device, and/or processing system as substantially described herein with reference to and as illustrated by the drawings.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
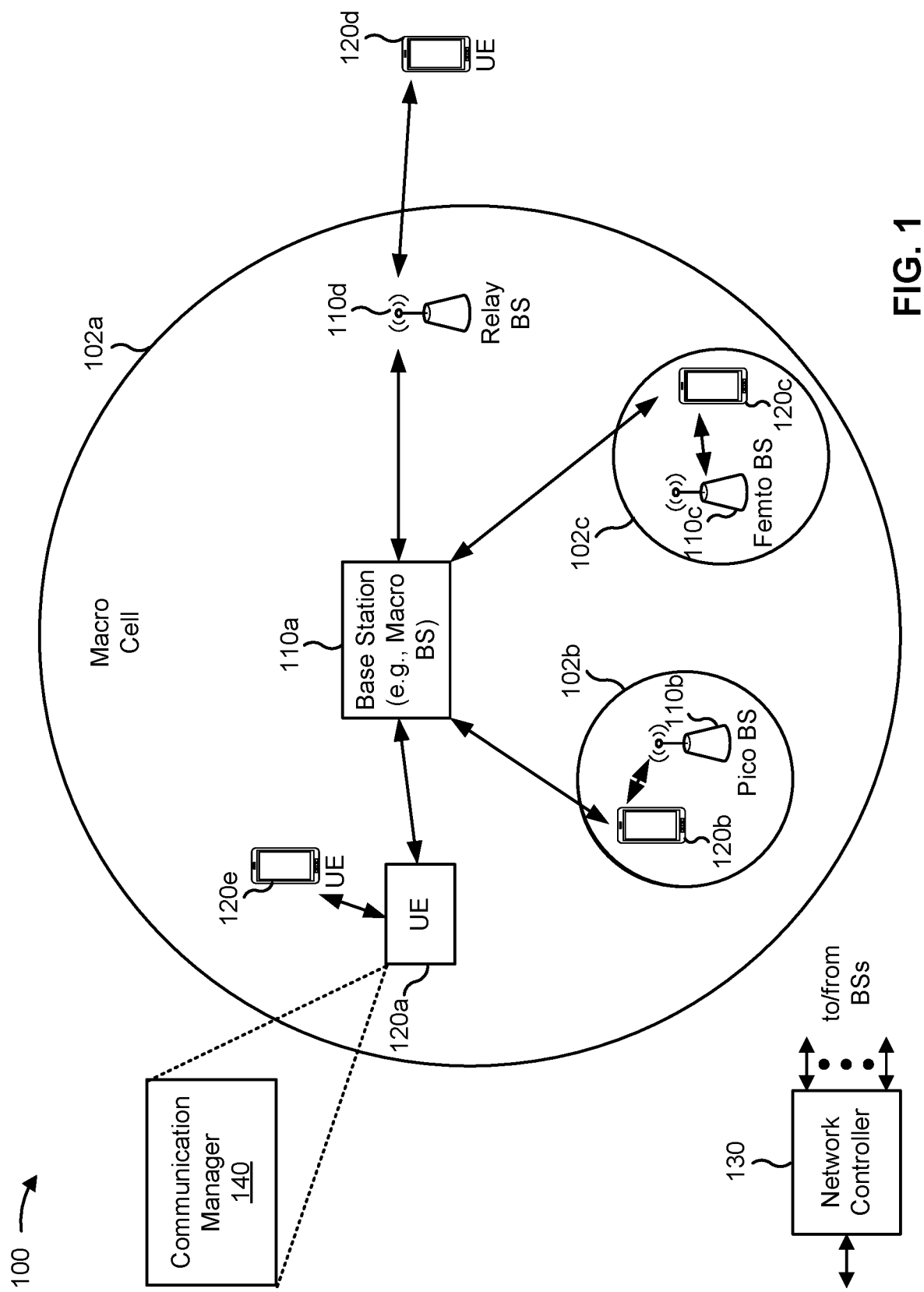
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

Deployment of communication systems, such as 5G NR systems, may be arranged in multiple manners with various components or constituent parts. In a 5G NR system, or network, a network node, a network entity, a mobility element of a network, a RAN node, a core network node, a network element, or a network equipment, such as a base station (BS, e.g., base station 110), or one or more units (or one or more components) performing base station functionality, may be implemented in an aggregated or disaggregated architecture. For example, a BS (such as a Node B (NB), eNB, NR BS, 5G NB, access point (AP), a TRP, a cell, or the like) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also can be implemented as virtual units, i.e., a virtual centralized unit (VCU), a virtual distributed unit (VDU), or a virtual radio unit (VRU).

Base station-type operation or network design may consider aggregation characteristics of base station functionality. For example, disaggregated base stations may be utilized in an integrated access backhaul (IAB) network, an O-RAN (such as the network configuration sponsored by the O-RAN Alliance), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110*d* (e.g., a relay base station) may communicate with the BS 110*a* (e.g., a macro base station) and the UE 120*d* in order to facilitate communication between the BS 110*a* and the UE 120*d*. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE (e.g., the UE 120, the relay UE 505, and/or the receiver UE 510) may include a communication manager 140. As described in more detail elsewhere herein, the communication manager 140 may obtain a common key; and communicate with one or more other UEs using a lower layer groupcast key that is based at least in part on the common key, a parameter, and at least one of a group identifier or a destination identifier. Additionally, or alternatively, the communication manager 140 may perform one or more other operations described herein.

In some aspects, as described in more detail elsewhere herein, the communication manager 140 may obtain a first unicast key, from a first receiver UE, and a second unicast key, from a second receiver UE; transmit, to the first receiver UE, a first communication that is based at least in part on a lower layer groupcast key and the first unicast key; and transmit, to the second receiver UE, a second communication that is based at least in part on the lower layer groupcast key and the second unicast key. Additionally, or alternatively, the communication manager 140 may perform one or more other operations described herein.

In some aspects, as described in more detail elsewhere herein, the communication manager 140 may transmit, to a relay UE, a unicast key associated with the receiver UE; and receive, from the relay UE, a communication that is based at least in part on the unicast key and a lower layer groupcast key associated with a plurality of receiver UEs that includes the receiver UE. Additionally, or alternatively, the communication manager 140 may perform one or more other operations described herein.

As indicated above, FIG. 1 is provided as an example. Other examples may differ from what is described with regard to FIG. 1.

Figure 2:
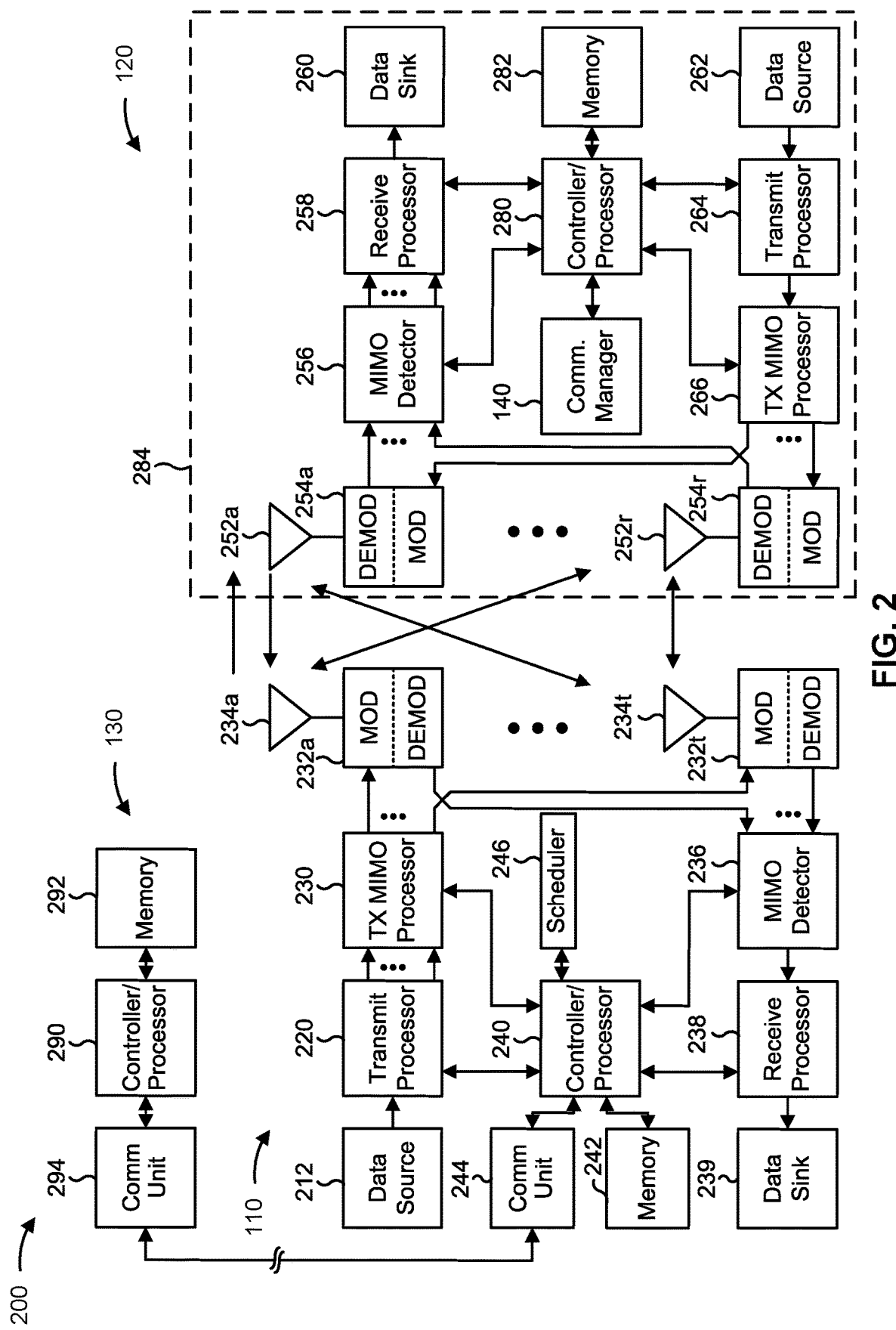
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 7-12).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 7-12).

The controller/processor 240 of the base station 110, the controller/processor 280 of the UE 120, and/or any other component(s) of FIG. 2 may perform one or more techniques associated with lower layer security for groupcast communications, as described in more detail elsewhere herein. For example, the controller/processor 240 of the base station 110, the controller/processor 280 of the UE 120, and/or any other component(s) of FIG. 2 may perform or direct operations of, for example, process 900 of FIG. 9, process 1000 of FIG. 10, process 1100 of FIG. 11, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 900 of FIG. 9, process 1000 of FIG. 10, process 1100 of FIG. 11, and/or other processes as described herein. In some examples, executing instructions may include running the instructions, converting the instructions, compiling the instructions, and/or interpreting the instructions, among other examples.

In some aspects, the UE (e.g., the UE 120, the relay UE 505, and/or the receiver UE 510) includes means for obtaining a common key; and/or means for communicating with one or more other UEs using a lower layer groupcast key that is based at least in part on the common key, a parameter, and at least one of a group identifier or a destination identifier. The means for the UE (e.g., the UE 120, the relay UE 505, and/or the receiver UE 510) to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the UE (e.g., the UE 120 and/or the relay UE 505) includes means for obtaining a first unicast key, from a first receiver UE, and a second unicast key, from a second receiver UE; means for transmitting, to the first receiver UE, a first communication that is based at least in part on a lower layer groupcast key and the first unicast key; and/or means for transmitting, to the second receiver UE, a second communication that is based at least in part on the lower layer groupcast key and the second unicast key. The means for the UE (e.g., the UE 120 and/or the relay UE 505) to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the UE (e.g., the UE 120 and/or the receiver UE 120) includes means for transmitting, to a relay UE, a unicast key associated with the receiver UE; and/or means for receiving, from the relay UE, a communication that is based at least in part on the unicast key and a lower layer groupcast key associated with a plurality of receiver UEs that includes the receiver UE. The means for the UE (e.g., the UE 120 and/or the receiver UE 120) to perform operations described herein may include, for example, one or more of communication manager 140, antenna 252, modem 254, MIMO detector 256, receive processor 258, transmit processor 264, TX MIMO processor 266, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
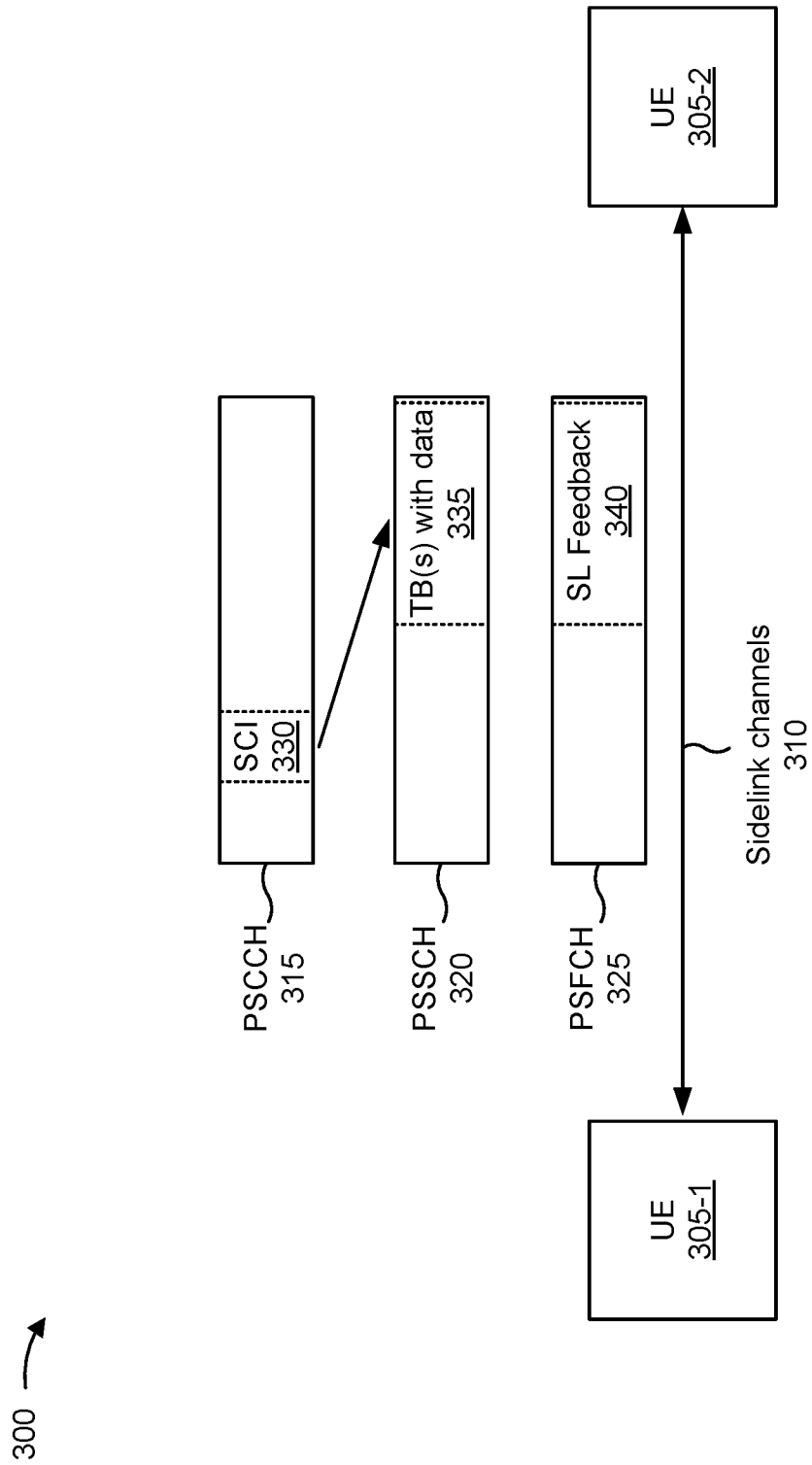
FIG. 3 is a diagram illustrating an example of sidelink communications, in accordance with the present disclosure.

FIG. 3 is a diagram illustrating an example 300 of sidelink communications, in accordance with the present disclosure.

As shown in FIG. 3, a first UE 305-1 may communicate with a second UE 305-2 (and one or more other UEs 305) via one or more sidelink channels 310. The UEs 305-1 and 305-2 may communicate using the one or more sidelink channels 310 for P2P communications, D2D communications, V2X communications (e.g., which may include V2V communications, V2I communications, and/or V2P communications) and/or mesh networking. In some aspects, the UEs 305 (e.g., UE 305-1 and/or UE 305-2) may correspond to one or more other UEs described elsewhere herein, such as UE 120. In some aspects, the one or more sidelink channels 310 may use a PC5 interface and/or may operate in a high frequency band (e.g., the 5.9 GHz band). Additionally, or alternatively, the UEs 305 may synchronize timing of transmission time intervals (TTIs) (e.g., frames, subframes, slots, or symbols) using global navigation satellite system (GNSS) timing.

As further shown in FIG. 3, the one or more sidelink channels 310 may include a physical sidelink control channel (PSCCH) 315, a physical sidelink shared channel (PSSCH) 320, and/or a physical sidelink feedback channel (PSFCH) 325. The PSCCH 315 may be used to communicate control information, similar to a physical downlink control channel (PDCCH) and/or a physical uplink control channel (PUCCH) used for cellular communications with a base station 110 via an access link or an access channel. The PSSCH 320 may be used to communicate data, similar to a physical downlink shared channel (PDSCH) and/or a physical uplink shared channel (PUSCH) used for cellular communications with a base station 110 via an access link or an access channel. For example, the PSCCH 315 may carry sidelink control information (SCI) 330, which may indicate various control information used for sidelink communications, such as one or more resources (e.g., time resources, frequency resources, and/or spatial resources) where a transport block (TB) 335 may be carried on the PSSCH 320. The TB 335 may include data. The PSFCH 325 may be used to communicate sidelink feedback 340, such as hybrid automatic repeat request (HARQ) feedback (e.g., acknowledgement or negative acknowledgement (ACK/NACK) information), transmit power control (TPC), and/or a scheduling request (SR).

Although shown on the PSCCH 315, in some aspects, the SCI 330 may include multiple communications in different stages, such as a first stage SCI (SCI-1) and a second stage SCI (SCI-2). The SCI-1 may be transmitted on the PSCCH 315. The SCI-2 may be transmitted on the PSSCH 320. The SCI-1 may include, for example, an indication of one or more resources (e.g., time resources, frequency resources, and/or spatial resources) on the PSSCH 320, information for decoding sidelink communications on the PSSCH, a quality of service (QoS) priority value, a resource reservation period, a PSSCH demodulation reference signal (DMRS) pattern, an SCI format for the SCI-2, a beta offset for the SCI-2, a quantity of PSSCH DMRS ports, and/or a modulation and coding scheme (MCS). The SCI-2 may include information associated with data transmissions on the PSSCH 320, such as a hybrid automatic repeat request (HARQ) process ID, a new data indicator (NDI), a source identifier, a destination identifier, and/or a channel state information (CSI) report trigger.

In some aspects, the one or more sidelink channels 310 may use resource pools. For example, a scheduling assignment (e.g., included in SCI 330) may be transmitted in sub-channels using specific resource blocks (RBs) across time. In some aspects, data transmissions (e.g., on the PSSCH 320) associated with a scheduling assignment may occupy adjacent RBs in the same subframe as the scheduling assignment (e.g., using frequency division multiplexing). In some aspects, a scheduling assignment and associated data transmissions are not transmitted on adjacent RBs.

In some aspects, a UE 305 may operate using a sidelink transmission mode (e.g., Mode 1) where resource selection and/or scheduling is performed by a base station 110. For example, the UE 305 may receive a grant (e.g., in downlink control information (DCI) or in a radio resource control (RRC) message, such as for configured grants) from the base station 110 for sidelink channel access and/or scheduling. In some aspects, a UE 305 may operate using a transmission mode (e.g., Mode 2) where resource selection and/or scheduling is performed by the UE 305 (e.g., rather than a base station 110). In some aspects, the UE 305 may perform resource selection and/or scheduling by sensing channel availability for transmissions. For example, the UE 305 may measure a received signal strength indicator (RSSI) parameter (e.g., a sidelink-RSSI (S-RSSI) parameter) associated with various sidelink channels, may measure a reference signal received power (RSRP) parameter (e.g., a PSSCH-RSRP parameter) associated with various sidelink channels, and/or may measure a reference signal received quality (RSRQ) parameter (e.g., a PSSCH-RSRQ parameter) associated with various sidelink channels, and may select a channel for transmission of a sidelink communication based at least in part on the measurement(s).

Additionally, or alternatively, the UE 305 may perform resource selection and/or scheduling using SCI 330 received in the PSCCH 315, which may indicate occupied resources and/or channel parameters. Additionally, or alternatively, the UE 305 may perform resource selection and/or scheduling by determining a channel busy rate (CBR) associated with various sidelink channels, which may be used for rate control (e.g., by indicating a maximum number of resource blocks that the UE 305 can use for a particular set of subframes).

In the transmission mode where resource selection and/or scheduling is performed by a UE 305, the UE 305 may generate sidelink grants, and may transmit the grants in SCI 330. A sidelink grant may indicate, for example, one or more parameters (e.g., transmission parameters) to be used for an upcoming sidelink transmission, such as one or more resource blocks to be used for the upcoming sidelink transmission on the PSSCH 320 (e.g., for TBs 335), one or more subframes to be used for the upcoming sidelink transmission, and/or a modulation and coding scheme (MCS) to be used for the upcoming sidelink transmission. In some aspects, a UE 305 may generate a sidelink grant that indicates one or more parameters for semi-persistent scheduling (SPS), such as a periodicity of a sidelink transmission. Additionally, or alternatively, the UE 305 may generate a sidelink grant for event-driven scheduling, such as for an on-demand sidelink message.

In some cases, a remote UE 305 may be connected to the network through a relay UE 305. The relay UE 305 may enable an authentication of the remote UE 305. Further, the network may establish a common sidelink key to enable the relay UE 305 to verify the remote UE 305. To do this, the network may use the non-access stratum (NAS) key of the relay UE 305 to transmit the NAS key of the remote UE 305 to the relay UE 305. The remote UE 305, on the other hand, may implicitly have the NAS key to verify the link of the remote UE 305.

In some cases, a pair of remote UEs 305 may establish links with each other. In this case, the remote UEs 305 may exchange certificates to establish a secure link between them. For example, the remote UEs 305 may use a process similar to that described in the Institute of Electrical and Electronics Engineers (IEEE) document 1609.2.

However, what has not been established is a process for lower layer security for groupcast relays. As described in more detail herein, the advantage of lower layer security for groupcast relays is that the detection of attacks can be performed more quickly than the detection of attacks using higher layer security, such as at the application layer.

As indicated above, FIG. 3 is provided as an example. Other examples may differ from what is described with respect to FIG. 3.

Figure 4:
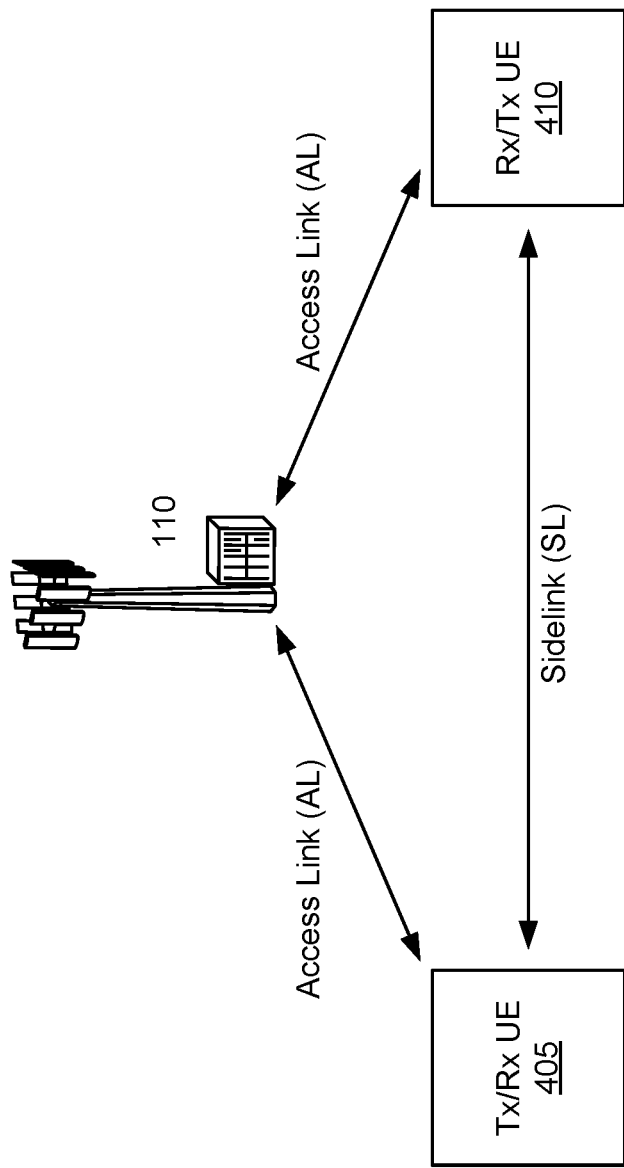
FIG. 4 is a diagram illustrating an example of sidelink communications and access link communications, in accordance with the present disclosure.

FIG. 4 is a diagram illustrating an example 400 of sidelink communications and access link communications, in accordance with the present disclosure.

As shown in FIG. 4, a transmitter (Tx)/receiver (Rx) UE 405 and an Rx/Tx UE 410 may communicate with one another via a sidelink, as described above in connection with FIG. 3. As further shown, in some sidelink modes, a base station 110 may communicate with the Tx/Rx UE 405 via a first access link. Additionally, or alternatively, in some sidelink modes, the base station 110 may communicate with the Rx/Tx UE 410 via a second access link. The Tx/Rx UE 405 and/or the Rx/Tx UE 410 may correspond to one or more UEs described elsewhere herein, such as the UE 120 of FIG. 1. Thus, a direct link between UEs 120 (e.g., via a PC5 interface) may be referred to as a sidelink, and a direct link between a base station 110 and a UE 120 (e.g., via a Uu interface) may be referred to as an access link. Sidelink communications may be transmitted via the sidelink, and access link communications may be transmitted via the access link. An access link communication may be either a downlink communication (from a base station 110 to a UE 120) or an uplink communication (from a UE 120 to a base station 110).

As described in more detail herein, a relay UE, such as the UE 405 or the UE 410, may be configured to generate and transmit a lower layer groupcast key for secure groupcast communications.

As indicated above, FIG. 4 is provided as an example. Other examples may differ from what is described with respect to FIG. 4.

Figure 5:
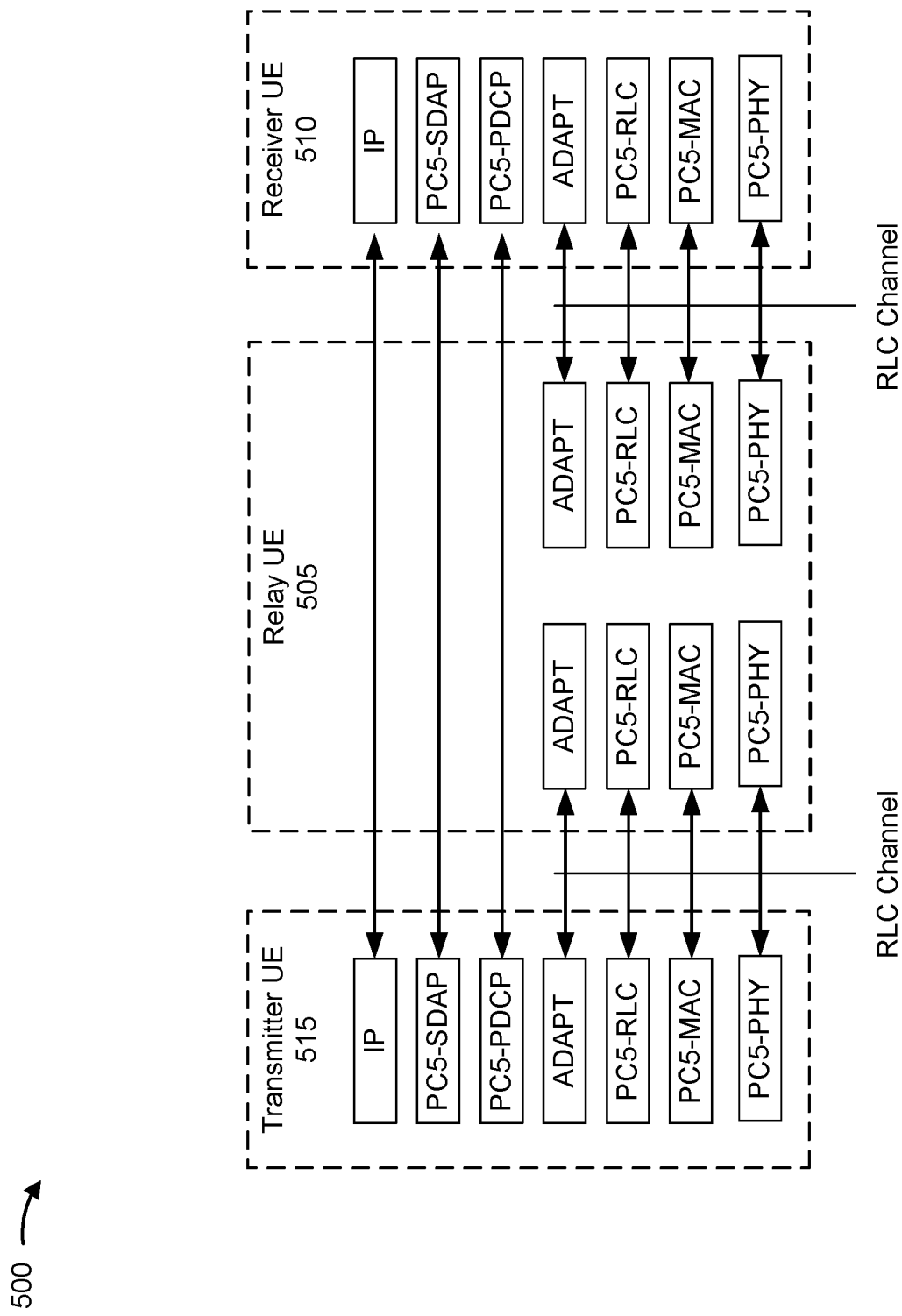
FIG. 5 is a diagram illustrating an example of a protocol stack for sidelink relay communications, in accordance with the present disclosure.

FIG. 5 is a diagram illustrating an example 500 of a protocol stack for sidelink relay communications, in accordance with the present disclosure. A relay UE 505 may communicate with a receiver UE 510 and a transmitter UE 515. For example, the relay UE 505 may relay communications from the transmitter UE 515 to the receiver UE 510.

The receiver UE 510 and the transmitter UE 515 may include respective physical (PHY) layers, medium access control (MAC) layers, radio link control (RLC) layers, adaptation (ADAPT) layers, packet data convergence protocol (PDCP) layers, service data adaptation protocol (SDAP) layers, and Internet Protocol (IP) layers. The relay UE 505 may include one or more of the ADAPT layer, RLC layer, MAC layer, and/or PHY layer. In some cases, the relay UE 305 may not include the PDCP, SDAP, or IP layers. As shown, the layers may be described in the context of the sidelink interface (e.g., the PC5 interface). For example, the MAC layer may be shown as a PC5-MAC layer. However, the individual layer are not limited to this feature. In some cases, a first layer is referred to as higher than a second layer if the first layer is further from the PHY layer than the second layer. For example, the PHY layer may be referred to as a lowest layer, and the SDAP/PDCP/RLC/MAC layer may be referred to as higher than the PHY layer and lower than a radio resource control (RRC) layer. In some cases, an entity may handle the services and functions of a given layer (e.g., a PDCP entity may handle the services and functions of the PDCP layer), though the description herein refers to the layers themselves as handling the services and functions.

The IP layer may be used for Internet Protocol communications between the transmitter UE 515 and the receiver UE 510. In some cases, a unit of data may be encapsulated in a packet, and the packet may be transmitted in a frame (e.g., an Ethernet frame) for communication between the transmitter UE 515 and the receiver UE 510. In some cases, the IP packet may include a source address (e.g., the IP address of the transmitter UE 515) and a destination address (e.g., the IP address of the receiver UE 510, or multiple receiver UEs 510).

The SDAP layer, PDCP layer, RLC layer, and MAC layer may be collectively referred to as Layer 2 (L2). Thus, in some cases, the SDAP, PDCP, RLC, and MAC layers are referred to as sublayers of Layer 2. On the transmitting side, the SDAP layer may receive a data flow in the form of a QoS flow. A QoS flow is associated with a QoS identifier, which identifies a QoS parameter associated with the QoS flow, and a QoS flow identifier (QFI), which identifies the QoS flow. Policy and charging parameters are enforced at the QoS flow granularity. A QoS flow can include one or more service data flows (SDFs), so long as each SDF of a QoS flow is associated with the same policy and charging parameters. In some aspects, the RRC/NAS layer may generate control information to be transmitted and may map the control information to one or more radio bearers for provision to the PDCP layer.

The SDAP layer, or the RRC/NAS layer, may map QoS flows or control information to radio bearers. Thus, the SDAP layer may be said to handle QoS flows on the transmitting side. The SDAP layer may provide the QoS flows to the PDCP layer via the corresponding radio bearers. The PDCP layer may map radio bearers to RLC channels. The PDCP layer may handle various services and functions, including sequence numbering, header compression and decompression (if robust header compression is enabled), transfer of user data, reordering and duplicate detection (if in-order delivery to layers above the PDCP layer is required), PDCP protocol data unit (PDU) routing (in case of split bearers), retransmission of PDCP service data units (SDUs), ciphering and deciphering, PDCP SDU discard (e.g., in accordance with a timer, as described elsewhere herein), PDCP re-establishment and data recovery for RLC acknowledged mode (AM), and duplication of PDCP PDUs.

The PDCP layer may provide data, in the form of PDCP PDUs, to the RLC layer via RLC channels. The RLC layer may handle transfer of upper layer PDUs to the MAC and/or PHY layers, sequence numbering independent of PDCP sequence numbering, error correction via automatic repeat requests (ARQ), segmentation and re-segmentation, reassembly of an SDU, RLC SDU discard, and RLC re-establishment.

The ADAPT layer may allow for communications to be relayed between transmitter UE 515 and the receiver UE 510. For example, the relay UE 505 may relay a transport block (TB) from the PHY layer of the transmitter UE 515 to the PHY layer of the UE 510. Additionally, or alternatively, the relay UE 505 may relay a PDU from the RLC layer, or the MAC layer, of the transmitter UE 505 to the RLC layer, or the MAC layer, of the receiver UE 510. The relay UE 505 may relay the communications via the sidelink (e.g., PC5) interface, as described herein.

The RLC layer may provide data, mapped to logical channels, to the MAC layer. The services and functions of the MAC layer include mapping between logical channels and transport channels (used by the PHY layer as described below), multiplexing/demultiplexing of MAC SDUs belonging to one or different logical channels into/from TBs delivered to/from the physical layer on transport channels, scheduling information reporting, error correction through hybrid ARQ (HARQ), priority handling between UEs by means of dynamic scheduling, priority handling between logical channels of one UE by means of logical channel prioritization, and padding.

The MAC layer may package data from logical channels into TBs, and may provide the TBs on one or more transport channels to the PHY layer. The PHY layer may handle various operations relating to transmission of a data signal, as described in more detail in connection with FIG. 2. The PHY layer is frequently referred to as Layer 1 (L1).

On the receiving side, the operations may be similar to those described for the transmitting side, but reversed. For example, the PHY layer may receive TBs and may provide the TBs on one or more transport channels to the MAC layer. The MAC layer may map the transport channels to logical channels and may provide data to the RLC layer via the logical channels. The RLC layer may map the logical channels to RLC channels and may provide data to the PDCP layer via the RLC channels. The PDCP layer may map the RLC channels to radio bearers and may provide data to the SDAP layer or the RRC/NAS layer via the radio bearers.

Data may be passed between the layers in the form of PDUs and SDUs. An SDU is a unit of data that has been passed from a layer or sublayer to a lower layer. For example, the PDCP layer may receive a PDCP SDU. A given layer may then encapsulate the unit of data into a PDU and may pass the PDU to a lower layer. For example, the PDCP layer may encapsulate the PDCP SDU into a PDCP PDU and may pass the PDCP PDU to the RLC layer. The RLC layer may receive the PDCP PDU as an RLC SDU, may encapsulate the RLC SDU into an RLC PDU, and so on. In effect, the PDU carries the SDU as a payload.

As described in more detail herein, a UE, such as the UE 120, may be configured to generate a lower layer groupcast key for secure groupcast communications. For example, the UE 120 may generate the groupcast key at the PHY layer, the MAC layer, or the RLC layer.

As indicated above, FIG. 5 is provided as an example. Other examples may differ from what is described with regard to FIG. 5.

Figure 6:
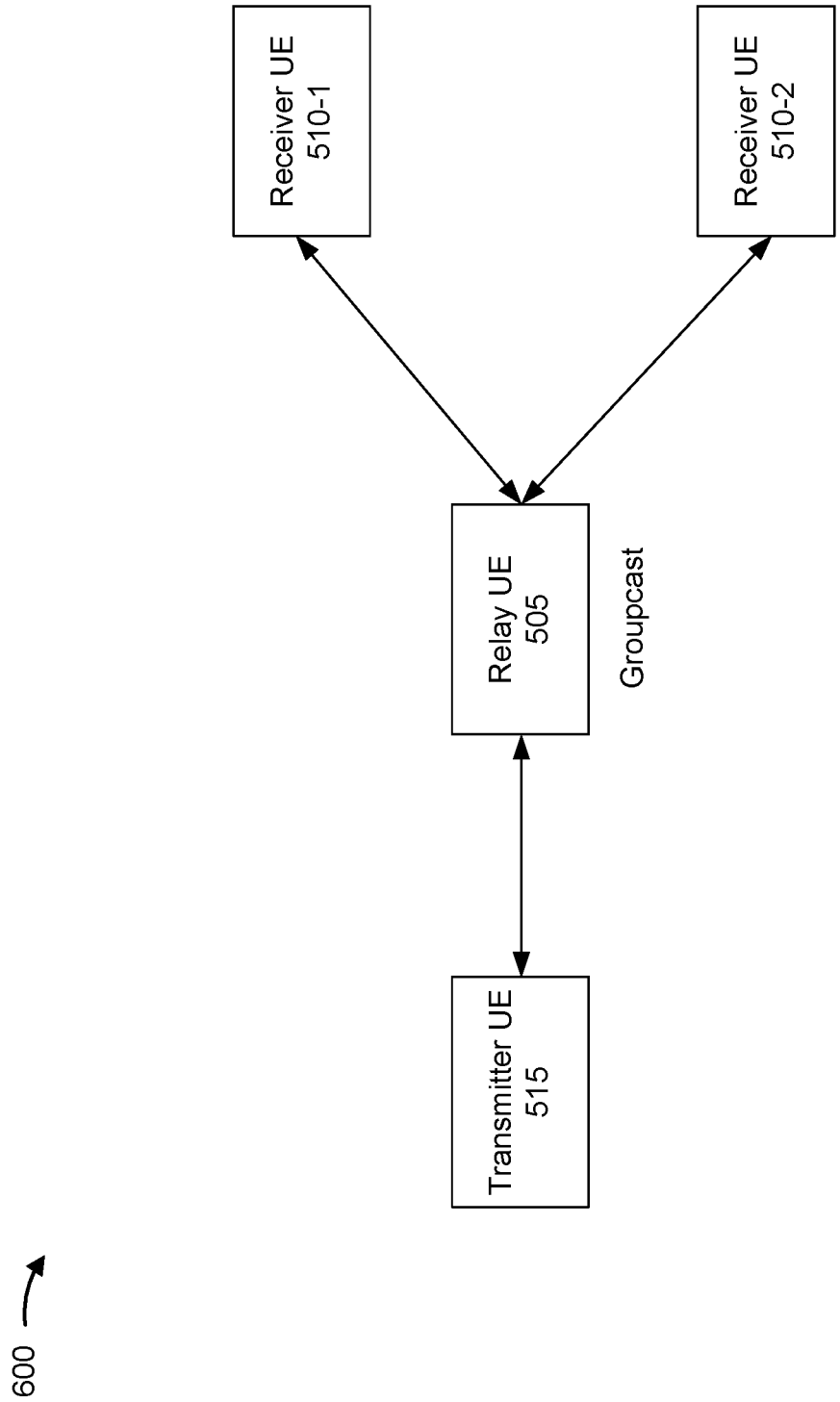
FIG. 6 is a diagram illustrating an example of groupcast relay, in accordance with the present disclosure.

FIG. 6 is a diagram illustrating an example 600 of groupcast relay, in accordance with the present disclosure. A relay UE, such as the relay UE 505, may transmit communications to one or more receiver UEs 510, such as the receiver UEs 510-1 and 510-2. For example, the relay UE 505 may receive a communication from a transmitter UE, such as the transmitter UE 515, and may transmit (e.g., relay) the communication from the transmitter UE 515 to one or more of the receiver UEs 510. In some cases, the communications may be groupcast communications, such as sidelink groupcast communications. The relay UE 505, the receiver UEs 510, and/or the transmitter UE 515 may include some or all of the features of the UE 120 described herein.

In some cases, a man-in-the-middle (MITM) attack may occur in one or more of the communication links. For example, an MITM attack may occur in a link between the transmitter UE 515 and the relay UE 505, or in a link between the relay UE 505 and any of the receiver UEs 510. In some cases, the only way to detect the MITM attack for groupcast communications is at the application layer. This may result in considerable latency. For example, as shown in the example 500, the 3GPP relaying architecture may not have a PDCP layer for L2 relaying. Thus, the relay UE 505 may only be configured to forward the groupcast data, without checking for possible MITM attacks in any of the links.

In some cases, each UE in the groupcast setting may not have a unicast connection. For example, the relay UE 505 may not have a unicast connection with one or more of the receiver UEs 510. Thus, it may not be possible to use a point-to-point (P2P) shared key between the relay UE 505 and the receiver UEs 510. Even if a unicast connection did exist between the relay UE 505 and each receiver UE 510, using the P2P shared key may become computationally intensive for the relay UE 505, since the relay UE 505 may need to encode groupcast traffic data using multiple P2P keys.

Techniques and apparatuses are described herein for lower layer security for groupcast communication. In some aspects, a UE, such as the relay UE 505, may obtain a key (e.g., a common key) that is common to a plurality of UEs, such as the relay UE 505 and the receiver UEs 510. The relay UE 505 may communicate with the receiver UEs 510 using a lower layer groupcast key that is based at least in part on the common key, a parameter, and at least one of a group identifier or a destination identifier. In some aspects, the relay UE 505 may obtain a first unicast key, from a first receiver UE 510-1, and a second unicast key, from a second receiver UE 510-2. The relay UE 505 may transmit, to the first receiver UE 510-1, a first communication that is based at least in part on the lower layer groupcast key and the first unicast key. Additionally, or alternatively, the relay UE 505 may transmit, to the second receiver UE 510-2, a second communication that is based at least in part on the lower layer groupcast key and the second unicast key.

As described above, the relay UE 505 may only be able to check for possible MITM attacks for groupcast communications at the application layer, which may result in considerable latency. Additionally, the relay UE 505 may not be configured to use a P2P shared key for encrypting the groupcast communications, which may increase the computational complexity for performing groupcast relay communications. Using the techniques and apparatuses described herein, the relay UE 505 may be able to perform a lower layer integrity check of a communication before transmitting the communication to the receiver UEs 510. Performing the integrity check at the lower layer, as compared to a higher layer, may reduce latency. Additionally, the relay UE 505 may be configured to generate a common key for the groupcast communications, thereby reducing the computational complexity for performing groupcast relay communications, without increasing the computational complexity. Other benefits are considered, and may be described in more detail below.

As indicated above, FIG. 6 is provided as an example. Other examples may differ from what is described with regard to FIG. 6.

Figure 7:
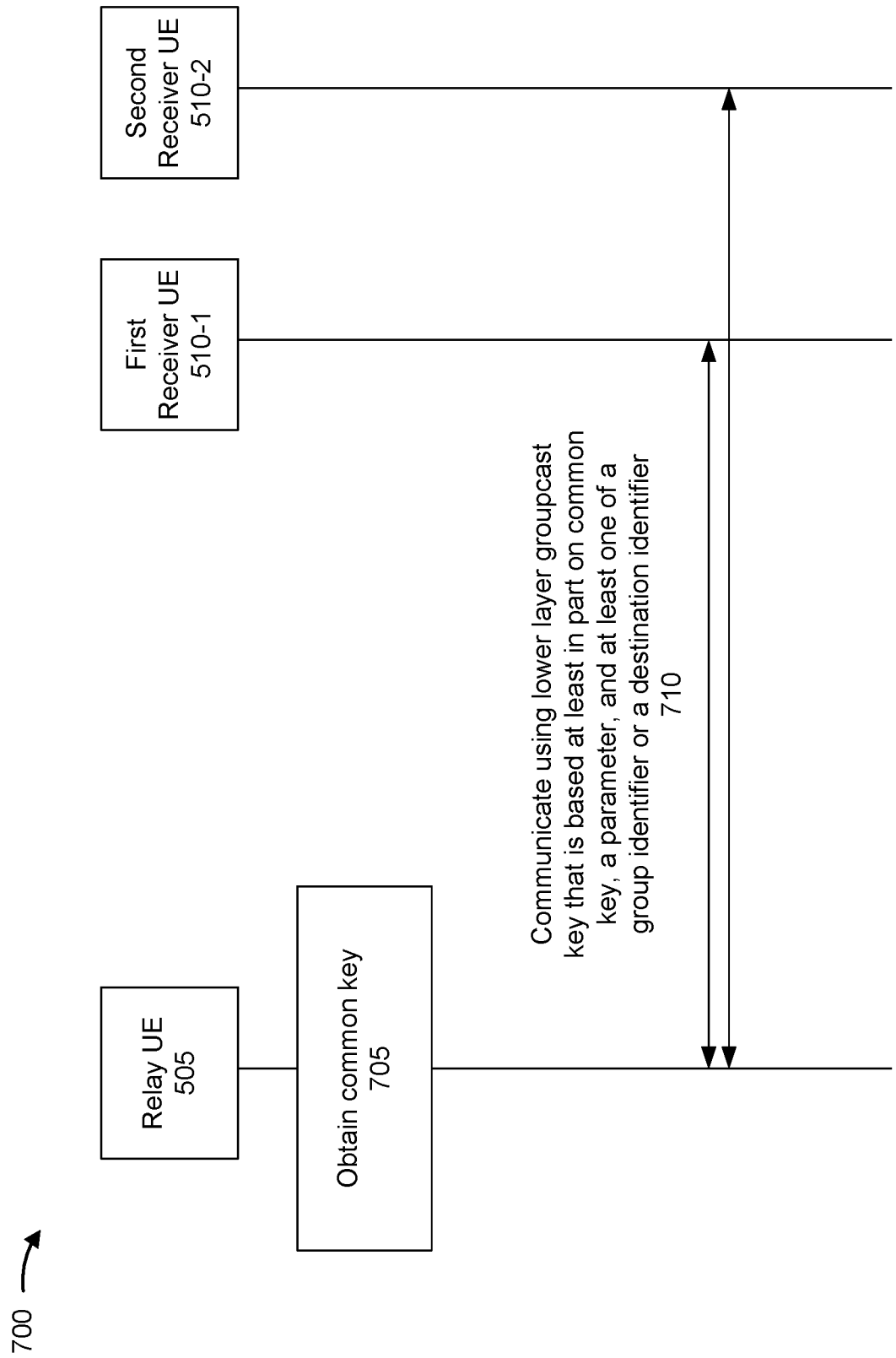
FIG. 7 is a diagram illustrating an example associated with lower layer key derivation without unicast connections, in accordance with the present disclosure.

FIG. 7 is a diagram illustrating an example 700 of lower layer key derivation without unicast connections, in accordance with the present disclosure. As described above, the relay UE 505 may communicate with one or more receiver UEs 510. For example, the relay UE 505 may relay a communication from a transmitter UE 515 (not shown) to one or more of the first receiver UE 510-1 and the second receiver UE 510-2. While the example 700 shows a first receiver UE 510-1 and a second UE 510-2, the relay UE 505 may communicate with any number of receiver UEs 510. For example, the relay UE 505 may generate a lower layer groupcast key, and transmit the lower layer groupcast key, for any number of receiver UEs 510.

As shown in connection with reference number 705, the relay UE 505 may obtain a common key. Additionally, or alternatively, one or more of the receiver UEs 510 may obtain the common key. For example, each of the relay UE 505, the first receiver UE 510-1, and the second receiver UE 510-2 may obtain the common key. In some aspects, the common key may be a key that is configured (e.g., pre-configured) in each of the relay UE 505, the first receiver UE 510-1, and the second receiver UE 510-2. The common key that is configured in the relay UE 505 may be the same as the common key that is configured in the first receiver UE 510-1 and the common key that is configured in the second receiver UE 510-2. In some aspects, the common key may be configured in the relay UE 505, the first receiver UE 510-1, and the second receiver UE 510-2 at a time of manufacture. In some aspects, the common key may be specific to the public land mobile network (PLMN) of the relay UE 505, the first receiver UE 510-1, and the second receiver UE 510-2. However, the common key may be any key that is shared by one or more of the relay UE 505, the first receiver UE 510-1, and the second receiver UE 510-2.

As shown in connection with reference number 710, the relay UE 505 may communicate with the receiver UEs 510 using a lower layer groupcast key. The lower layer groupcast key may be based at least in part on the common key, a parameter, and at least one of a group identifier or a destination identifier.

In some aspects, the parameter may be based at least in part on the layer at which the lower layer groupcast key is derived. For example, if the lower layer groupcast key is derived at the PHY layer, the parameter may be a slot number, a frame number, or a subframe number associated with the transmission of the lower layer groupcast key. Alternatively, if the lower layer groupcast key is derived at the MAC or RLC layer, the parameter may be a MAC or RLC PDU count.

In some aspects, the group identifier may be associated with a groupcast communication session. For example, the group identifier may be associated with the groupcast communication session that is established between the relay UE 505, the first receiver UE 510-1, and the second receiver UE 510-2.

In some aspects, the destination identifier may be an L2 destination identifier. For example, the destination identifier may be a 24-bit L2 destination identifier.

In a first example, the lower layer groupcast key may be based at least in part on the common key, the parameter, and the group identifier.

In a second example, the lower layer groupcast key may be based at least in part on the common key, the parameter, and the destination identifier (e.g., the entire 24-bit destination identifier).

In a third example, the lower layer groupcast key may be based at least in part on the common key, the parameter, and a portion (e.g., a first eight bits) of the destination identifier (e.g., the first eight bits of the 24-bit destination identifier).

In some aspects, the relay UE 505 may generate the lower layer groupcast key using a key derivation function. Additionally, or alternatively, one or more of the receiver UEs 510 may generate the lower layer groupcast key using the key derivation function. For example, each of the relay UE 505, the first receiver UE 510-1, and the second receiver UE 510-2 may be configured with the same key derivation function.

In the first example, the relay UE 505 may generate the lower layer groupcast key using the key derivation function with the common key, the parameter, and the group identifier as inputs. This may be represented by the following equation:

$$K_G = KDF(K_{SL}, \text{Group ID}, p), \text{ where}$$

$K_G$ is the lower layer groupcast key,
KDF is the key derivation function,
$K_{SL}$ is the common key,
Group ID is the group identifier, and
p is the parameter.

In the second example, the relay UE 505 may generate the lower layer groupcast key using the key derivation function with the common key, the parameter, and the destination identifier (e.g., the entire 24-bit destination identifier) as inputs. This may be represented by the following equation:

$$K_G = KDF(K_{SL}, L2 \text{ DST ID}, p), \text{ where}$$

L2 DST ID is the 24-bit destination identifier.

In the third example, the relay UE 505 may generate the lower layer groupcast key using a key derivation function with the common key, the parameter, and the portion (e.g., the first eight bits) of the destination identifier as inputs. This may be represented by the following equation:

$$K_G = KDF(K_{SL}, \text{first 8 bits of } L2 \text{ DST ID}, p).$$

In some aspects, the relay UE 505 may not have a unicast connection with one or more of the receiver UEs 510. Since the receiver UEs 510, such as the first receiver UE 510-1 and the second receiver UE 510-2, are aware of the common key, the parameter, the group identifier, and/or the destination identifier, the receiver UEs 510 may be configured to generate the lower layer groupcast key autonomously (e.g., despite not having the unicast connection with the relay UE 505).

In some aspects, only the UEs involved in the groupcast session may have access to certain private information. For example, in the first example described above, only the UEs in the groupcast session may have access to the group identifier. In the third example described above, only the UEs in the groupcast session may have access to the first eight bits of the destination identifier. In both of these examples, other UEs (e.g., UEs not in the groupcast session) may not be able to determine the private information from SCI that is transmitted between the relay UE 505 and the receiver UEs 510.

In some aspects, all UEs (e.g., including an eavesdropper UE) may have access to the private information. For example, in the second example described above, all UEs may have access to the last sixteen bits of the destination identifier (e.g., the L1 destination identifier) as this information may be included in the SCI that is transmitted between the relay UE 505 and the receiver UEs 510.

In some aspects, the receiver UEs 510 may use the lower layer groupcast key to perform one or more functions. At the PHY layer, a receiver UE (e.g., the first receiver UE 510-1) may determine (e.g., derive) a message authentication code for a transport block, encode the transport block using the lower layer groupcast key, and append the message authentication code to the encoded transport block. The first receiver UE 510-1 may perform this function for a plurality of transport blocks (e.g., for every transport block in the data channel and/or the control channel). At the RLC or MAC layer, the first receiver UE 510-1 may determine (e.g., derive) the message authentication code for a PDU (e.g., a data PDU or a control PDU), encode the PDU using the lower layer groupcast key, and append the message authentication code to the encoded PDU. The first receiver UE 510-1 may perform this function for a plurality of PDUs.

In some aspects, the relay UE 505 may receive lower layer data from a receiver UE 510 (e.g., the first receiver UE 510-1). The relay UE 505, based at least in part on receiving the lower layer data, may determine (e.g., infer), based at least in part on SCI transmitted by the first receiver UE 510-1, whether the first receiver UE 510-1 is part of the group. If the first receiver UE 510-1 is part of the group using the lower layer groupcast key, the relay UE 505 may perform one or more of the following. In a first example, if PHY layer integrity protection is enabled, the relay UE 505 may derive a transport block level message authentication code derivation using the lower layer groupcast key. In a second example, if RLC or MAC integrity protection is enabled, the relay UE 505 may perform a PDU level derivation of the message authentication code using the lower layer groupcast key. If the message authentication code determined at the relay UE 505 does not match the message authentication code received from the first receiver UE 510-1 (e.g., for a number of transport blocks or PDUs that is greater than a threshold number of transport blocks or PDUs), the relay UE 505 may drop the packet, or may otherwise not transmit the packet.

In some aspects, upon determining a possible MITM attack in a link (e.g., from the relay UE 505 to the first receiver UE 510-1), the relay UE 505 may determine a new lower layer groupcast key, and may transmit the new lower layer groupcast key to the receiver UEs 510, using one or more of the example processes described regarding the example 700.

As described above, the relay UE 505 may only be able to check for possible MITM attacks for groupcast communications at the application layer, which may result in considerable latency. Additionally, the relay UE 505 may not be configured to use a P2P shared key for encrypting the groupcast communications, which may increase the computational complexity for performing groupcast relay communications. Using the techniques and apparatuses described herein, the relay UE 505 may be able to perform a lower layer integrity check of a communication before transmitting the communication to the receiver UEs 510. Performing the integrity check at the lower layer, as compared to a higher layer, may reduce latency. Additionally, the relay UE 505 may be configured to generate a common key for the groupcast communications, thereby reducing the computational complexity for performing groupcast relay communications, without increasing the computational complexity.

As indicated above, FIG. 7 is provided as an example. Other examples may differ from what is described with regard to FIG. 7.

Figure 8:
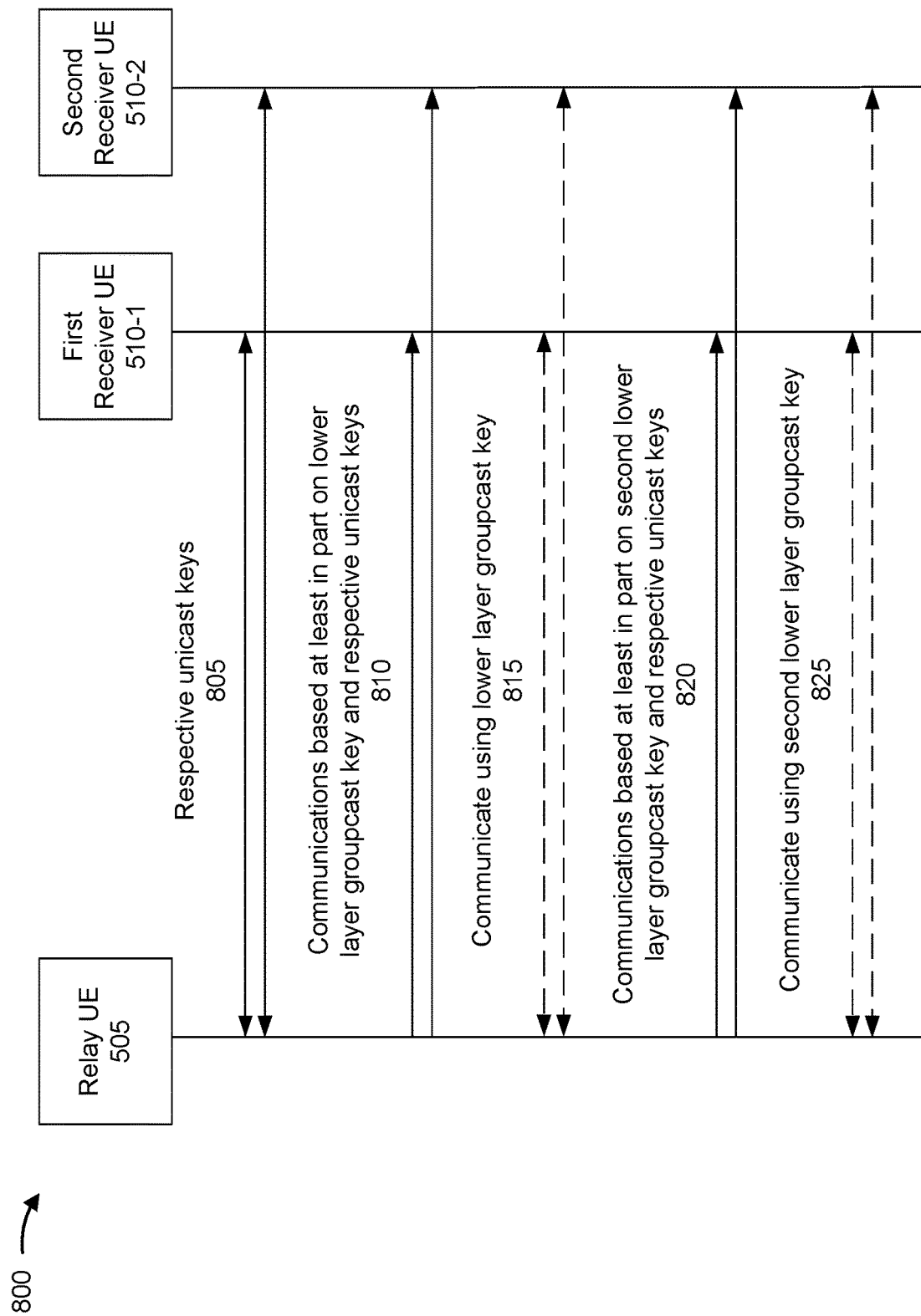
FIG. 8 is a diagram illustrating an example associated with lower layer key derivation with unicast connections, in accordance with the present disclosure.

FIG. 8 is a diagram illustrating an example 800 of lower layer key derivation with unicast connections, in accordance with the present disclosure. As described above, the relay UE 505 may communicate with one or more receiver UEs 510. While the example 800 shows a first receiver UE 510-1 and a second UE 510-2, the relay UE 505 may communicate with any number of receiver UEs 510. For example, the relay UE 505 may generate a lower layer groupcast key, and transmit the lower layer groupcast key, for any number of receiver UEs 510.

As shown in connection with reference number 805, the relay UE 505 may obtain one or more unicast keys. In some aspects, the relay UE 505 may obtain (e.g., receive) respective unicast keys from each of the first receiver UE 510-1 and the second receiver UE 510-2. For example, the relay UE 505 may receive a first unicast key from the first receiver UE 510-1, and a second unicast key from the second receiver UE 510-2. In some aspects, the relay UE 505 and one or more of the receiver UEs 510 may exchange certificates to derive the unicast keys. For example, the relay UE 505 and the first receiver UE 510-1 may exchange certificates to derive the first unicast key, and the relay UE 505 and the second receiver UE 510-2 may exchange certificates to derive the second unicast key.

As shown in connection with reference number 810, the relay UE 505 may transmit one or more communications based at least in part on a lower layer groupcast key and the respective unicast keys. For example, the relay UE 505 may transmit, and the first receiver UE 510-1 may receive, a first communication that is based at least in part on the lower layer groupcast key and the first unicast key. Additionally, or alternatively, the relay UE 505 may transmit, and the second receiver UE 510-2 may receive, a second communication that is based at least in part on the lower layer groupcast key and the second unicast key. In some aspects, the lower layer groupcast key may be the lower layer groupcast key described above in connection with the example 700.

In some aspects, the first communication may be a combination, or may include a combination, of the lower layer groupcast key and the first unicast key. For example, the first communication may be an exclusive OR (XOR) combination, or may include an XOR combination, of the lower layer groupcast key and the first unicast key. In some aspects, the second communication may be a combination, or may include a combination, of the lower layer groupcast key and the second unicast key. For example, the second communication may be an XOR combination, or may include an XOR combination, of the lower layer groupcast key and the second unicast key.

As shown in connection with reference number 815, the relay UE 505 and the receiver UEs 510 may communicate using the lower layer groupcast key.

In some aspects, the first receiver UE 510-1 and/or the second receiver UE 510-2 may determine (e.g., derive) the lower layer groupcast key from the first communication and/or the second communication. For example, the first receiver UE 510-1 may be configured with the first unicast key. The first receiver UE 510-1 may receive the first communication, and may determine the lower layer groupcast key from the first communication based at least in part on the first unicast key. Similarly, the second receiver UE 510-2 may be configured with the second unicast key. The second receiver UE 510-2 may receive the second communication, and may determine the lower layer groupcast key based at least in part on the second unicast key.

In some aspects, the relay UE 505 may transmit a secure groupcast communication to both the first receiver UE 510-1 and the second receiver UE 510-2 using the lower layer groupcast key. In some aspects, the relay UE 505 may transmit a secure groupcast communication to one of the first receiver UE 510-1 or the second receiver UE 510-2 using the lower layer groupcast key. In some aspects, the first receiver UE 510-1 may transmit a secure groupcast communication to the relay UE 505 using the lower layer groupcast key. In some aspects, the second receiver UE 510-2 may transmit a secure groupcast communication to the relay UE 505 using the lower layer groupcast key. A UE that is not configured with the lower layer groupcast key may not be able to receive the communication, or may not be able to accurately decode the communication, or otherwise interpret the communication.

In some aspects, the receiver UEs 510 may use the lower layer groupcast key to perform one or more functions. At the PHY layer, a receiver UE (e.g., the first receiver UE 510-1) may determine (e.g., derive) a message authentication code for a transport block, encode the transport block using the lower layer groupcast key, and append the message authentication code to the encoded transport block. The first receiver UE 510-1 may perform this function for a plurality of transport blocks (e.g., for every transport block in the data channel and/or the control channel). At the RLC or MAC layer, the first receiver UE 510-1 may determine (e.g., derive) the message authentication code for a PDU (e.g., a data PDU or a control PDU), encode the PDU using the lower layer groupcast key, and append the message authentication code to the encoded PDU. The first receiver UE 510-1 may perform this function for a plurality of PDUs.

In some aspects, the relay UE 505 may receive lower layer data from a receiver UE 510 (e.g., the first receiver UE 510-1). The relay UE 505, based at least in part on receiving the lower layer data, may determine (e.g., infer), based at least in part on SCI transmitted by the first receiver UE 510-1, whether the first receiver UE 510-1 is part of the group using the lower layer groupcast key. If the first receiver UE 510-1 is part of the group using the lower layer groupcast key, the relay UE 505 may perform one or more of the following. In a first example, if PHY layer integrity protection is enabled, the relay UE 505 may derive message authentication code at the transport block level using the lower layer groupcast key. In a second example, if RLC or MAC integrity protection is enabled, the relay UE 505 may perform a PDU level message authentication code derivation using the lower layer groupcast key. If the message authentication code determined at the relay UE 505 does not match the message authentication code received from the first receiver UE 510-1 (e.g., for a number of transport blocks or PDUs that are greater than a threshold number of transport blocks or PDUs), the relay UE 505 may drop the packet, or may otherwise not transmit the packet.

As shown in connection with reference number 820, the relay UE 505 may transmit one or more communications based at least in part on a second lower layer groupcast key and the respective unicast keys.

In some aspects, the relay UE 505 may generate a second lower layer groupcast key. For example, the relay UE 505 may detect a possible MITM attack, and may determine that communications using the lower layer groupcast key are no longer secure. Thus, the relay UE 505 may generate a second lower layer groupcast key in order to secure the groupcast communication session. In some aspects, the relay UE 505 may generate new lower layer groupcast keys periodically in order to maintain the security of the groupcast communication, regardless of whether or not an MITM attack has been detected.

In some aspects, the relay UE 505 may transmit the second lower layer groupcast key as described above in connection with reference number 810. For example, the relay UE 505 may transmit a third communication, to the first receiver UE 510-1, that includes the first unicast key and the second lower layer groupcast key. In some aspects, the third communication may be an XOR combination, or may include an XOR combination, of the first unicast key and the second lower layer groupcast key. Additionally, or alternatively, the relay UE 505 may transmit, to the second receiver UE 510-2, a fourth communication that includes the second unicast key and the second lower layer groupcast key. In some aspects, the fourth communication may be an XOR combination, or may include an XOR combination, of the second unicast key and the second lower layer groupcast key.

As shown in connection with reference number 825, the relay UE 505 and the receiver UEs 510 may communicate using the second lower layer groupcast key. In some aspects, the receiver UEs 510 may determine the second lower layer groupcast key as described above in connection with reference number 815. For example, the first receiver UE 510-1 may determine the second lower layer groupcast key based at least in part on the third communication and the first unicast key, and the second receiver UE 510-2 may determine the second lower layer groupcast key based at least in part on the fourth communication and the second unicast key.

As described above, the relay UE 505 may only be able to check for possible MITM attacks for groupcast communications at the application layer, which may result in considerable latency. Additionally, the relay UE 505 may not be configured to use a P2P shared key for encrypting the groupcast communications, which may increase the computational complexity for performing groupcast relay communications. Using the techniques and apparatuses described herein, the relay UE 505 may be able to perform a lower layer integrity check of a communication before transmitting the communication to the receiver UEs 510. Performing the integrity check at the lower layer, as compared to a higher layer, may reduce latency. Additionally, the relay UE 505 may be configured to generate a common key for the groupcast communications, thereby reducing the computational complexity for performing groupcast relay communications, without increasing the computational complexity.

As indicated above, FIG. 8 is provided as an example. Other examples may differ from what is described with regard to FIG. 8.

Figure 9:
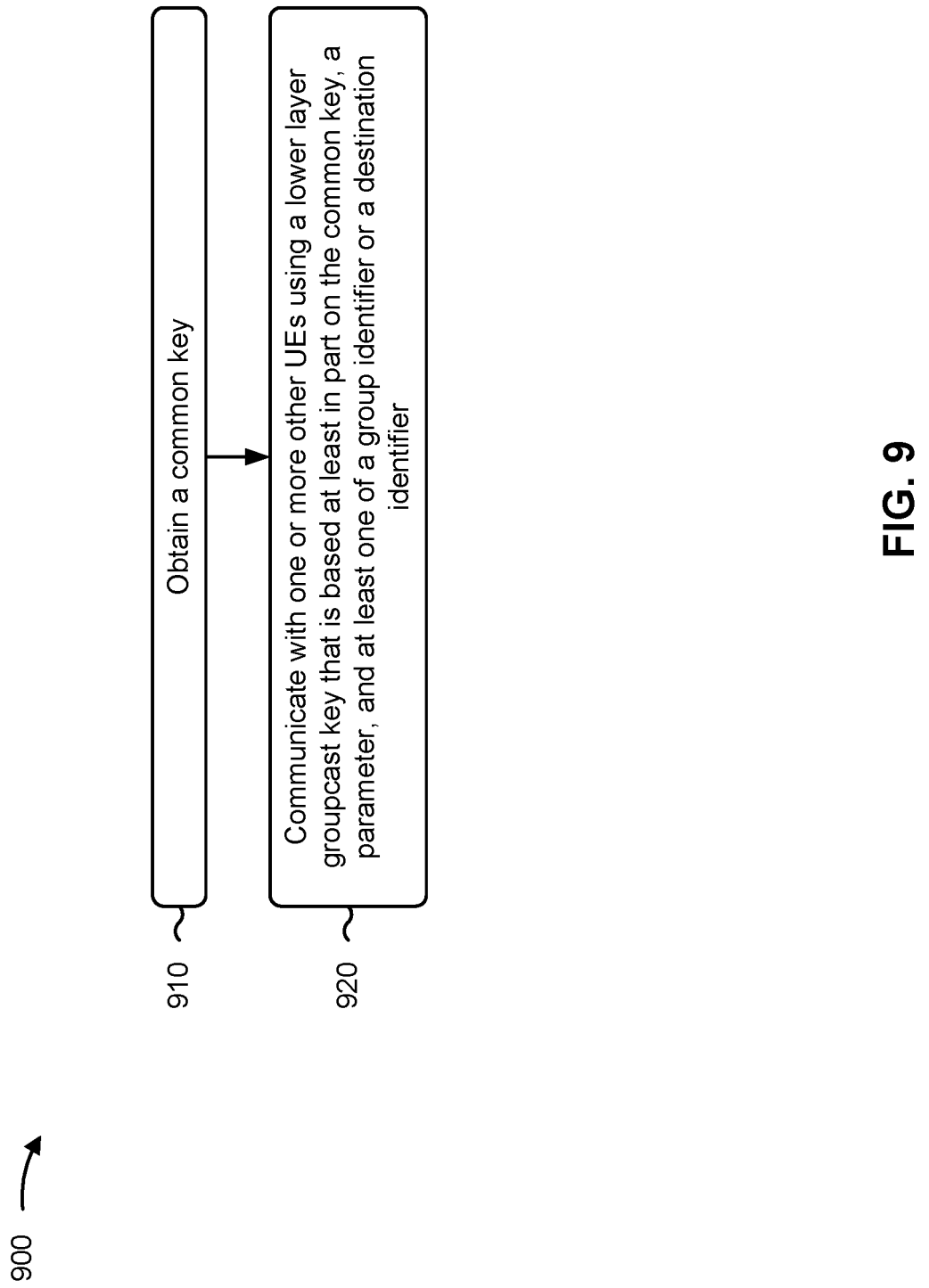
FIG. 9 is a diagram illustrating an example process associated with lower layer key derivation without unicast connections, in accordance with the present disclosure.

FIG. 9 is a diagram illustrating an example process 900 performed, for example, by a UE, in accordance with the present disclosure. Example process 900 is an example where the UE (e.g., the UE 120, the relay UE 505, or the receiver UE 510) performs operations associated with lower layer security for groupcast communication.

As shown in FIG. 9, in some aspects, process 900 may include obtaining a common key (block 910). For example, the UE (e.g., using communication manager 140 and/or obtaining component 1208, depicted in FIG. 12) may obtain a common key, as described above.

As further shown in FIG. 9, in some aspects, process 900 may include communicating with one or more other UEs using a lower layer groupcast key that is based at least in part on the common key, a parameter, and at least one of a group identifier or a destination identifier (block 920). For example, the UE (e.g., using communication manager 140, reception component 1202, and/or transmission component 1204, depicted in FIG. 12) may communicate with one or more other UEs using a lower layer groupcast key that is based at least in part on the common key, a parameter, and at least one of a group identifier or a destination identifier, as described above.

Process 900 may include additional aspects, such as any single aspect or any combination of aspects described below and/or in connection with one or more other processes described elsewhere herein.

In a first aspect, the lower layer groupcast key is based at least in part on the common key, the parameter, and the group identifier.

In a second aspect, alone or in combination with the first aspect, the lower layer groupcast key is based at least in part on the common key, the parameter, and the destination identifier.

In a third aspect, alone or in combination with one or more of the first and second aspects, the lower layer groupcast key is based at least in part on the common key, the parameter, and a portion of the destination identifier.

In a fourth aspect, alone or in combination with one or more of the first through third aspects, the lower layer groupcast key is a physical layer key, a MAC layer key, or an RLC layer key.

In a fifth aspect, alone or in combination with one or more of the first through fourth aspects, the parameter is one of a slot number, a frame number, or a subframe number, based at least in part on the lower layer groupcast key being a physical layer key; a MAC PDU count, based at least in part on the lower layer groupcast key being a MAC layer key; or an RLC PDU count, based at least in part on the lower layer groupcast key being an RLC layer key.

In a sixth aspect, alone or in combination with one or more of the first through fifth aspects, the common key is configured in the UE and the one or more other UEs, the group identifier is associated with a groupcast communication session between the UE and the one or more other UEs, and the destination identifier is a layer 2 destination identifier.

In a seventh aspect, alone or in combination with one or more of the first through sixth aspects, the UE does not have a unicast connection with at least one of the one or more other UEs.

In an eighth aspect, alone or in combination with one or more of the first through seventh aspects, process 900 includes generating the lower layer groupcast key using a key derivation function that is based at least in part on the common key, the parameter, and at least one of the group identifier or the destination identifier.

In a ninth aspect, alone or in combination with one or more of the first through eighth aspects, communicating with the one or more other UEs comprises communicating with the one or more other UEs, via a sidelink groupcast communication, using the lower layer groupcast key.

In a tenth aspect, alone or in combination with one or more of the first through ninth aspects, process 900 includes determining a message authentication code for a transport block, generating an encoded transport block using the lower layer groupcast key, and appending the message authentication code to the encoded transport block.

In an eleventh aspect, alone or in combination with one or more of the first through tenth aspects, process 900 includes determining a message authentication code for a PDU, generating an encoded PDU using the lower layer groupcast key, and appending the message authentication code to the encoded PDU.

In a twelfth aspect, alone or in combination with one or more of the first through eleventh aspects, process 900 includes determining, using the lower layer groupcast key, that a communication is associated with the group identifier, and if a physical layer integrity protection is enabled, performing a transport block level derivation of a message authentication code associated with the communication, or if a radio link control integrity protection or a medium access control integrity protection is enabled, performing protocol data unit level derivation of the message authentication code associated with the communication.

In a thirteenth aspect, alone or in combination with one or more of the first through twelfth aspects, process 900 includes determining to drop the communication of the derived message authentication code associated with the communication does not match an other (i.e., another) message authentication code received from the one or more other UEs.

In a fourteenth aspect, alone or in combination with one or more of the first through thirteenth aspects, process 900 includes generating a second lower layer groupcast key based at least in part on detecting an indication of a man-in-the-middle attack.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
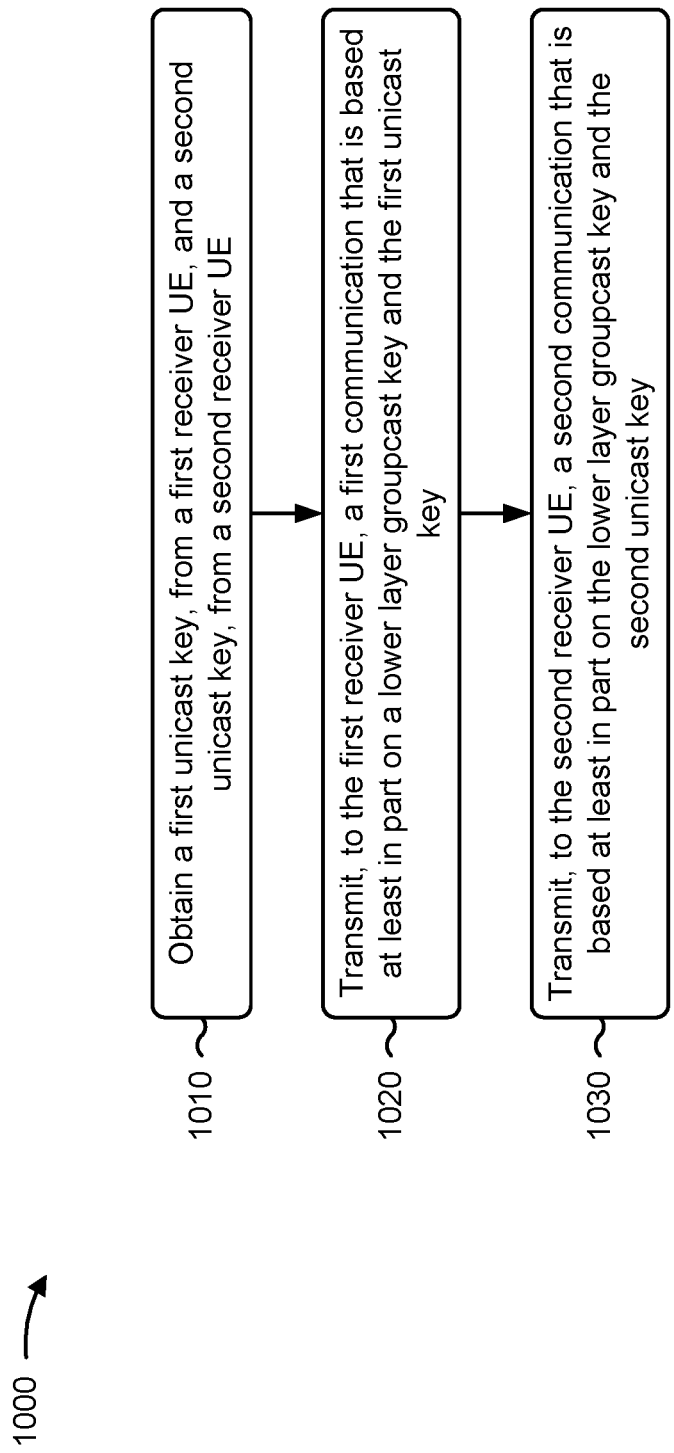
FIG. 10 is a diagram illustrating a first example process associated with lower layer key derivation with unicast connections, in accordance with the present disclosure.

FIG. 10 is a diagram illustrating an example process 1000 performed, for example, by a relay UE, in accordance with the present disclosure. Example process 1000 is an example where the UE (e.g., the UE 120 or the relay UE 505) performs operations associated with lower layer security for groupcast communication.

As shown in FIG. 10, in some aspects, process 1000 may include obtaining a first unicast key, from a first receiver UE, and a second unicast key, from a second receiver UE (block 1010). For example, the UE (e.g., using communication manager 140 and/or obtaining component 1208, depicted in FIG. 12) may obtain a first unicast key, from a first receiver UE, and a second unicast key, from a second receiver UE, as described above.

As further shown in FIG. 10, in some aspects, process 1000 may include transmitting, to the first receiver UE, a first communication that is based at least in part on a lower layer groupcast key and the first unicast key (block 1020). For example, the UE (e.g., using communication manager 140 and/or transmission component 1204, depicted in FIG. 12) may transmit, to the first receiver UE, a first communication that is based at least in part on a lower layer groupcast key and the first unicast key, as described above.

As further shown in FIG. 10, in some aspects, process 1000 may include transmitting, to the second receiver UE, a second communication that is based at least in part on the lower layer groupcast key and the second unicast key (block 1030). For example, the UE (e.g., using communication manager 140 and/or transmission component 1204, depicted in FIG. 12) may transmit, to the second receiver UE, a second communication that is based at least in part on the lower layer groupcast key and the second unicast key, as described above.

Process 1000 may include additional aspects, such as any single aspect or any combination of aspects described below and/or in connection with one or more other processes described elsewhere herein.

In a first aspect, process 1000 includes communicating with at least one of the first receiver UE and the second receiver UE, via a sidelink groupcast communication, using the lower layer groupcast key.

In a second aspect, alone or in combination with the first aspect, the first communication is a logical combination of the lower layer groupcast key and the first unicast key, and the second communication is a logical combination of the lower layer groupcast key and the second unicast key.

In a third aspect, alone or in combination with one or more of the first and second aspects, the lower layer groupcast key is a physical layer key, a medium access control layer key, or a radio link control layer key.

In a fourth aspect, alone or in combination with one or more of the first through third aspects, process 1000 includes transmitting, to the first receiver UE, a third communication that is based at least in part on a second lower layer groupcast key and the first unicast key; transmitting, to the second receiver UE, a fourth communication that is based at least in part on the second lower layer groupcast key and the second unicast key; and communicating with the first receiver UE and the second receiver UE using the second lower layer groupcast key.

In a fifth aspect, alone or in combination with one or more of the first through fourth aspects, obtaining the first unicast key comprises exchanging a certificate with the first receiver UE, and obtaining the second unicast key comprises exchanging a certificate with the second receiver UE.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
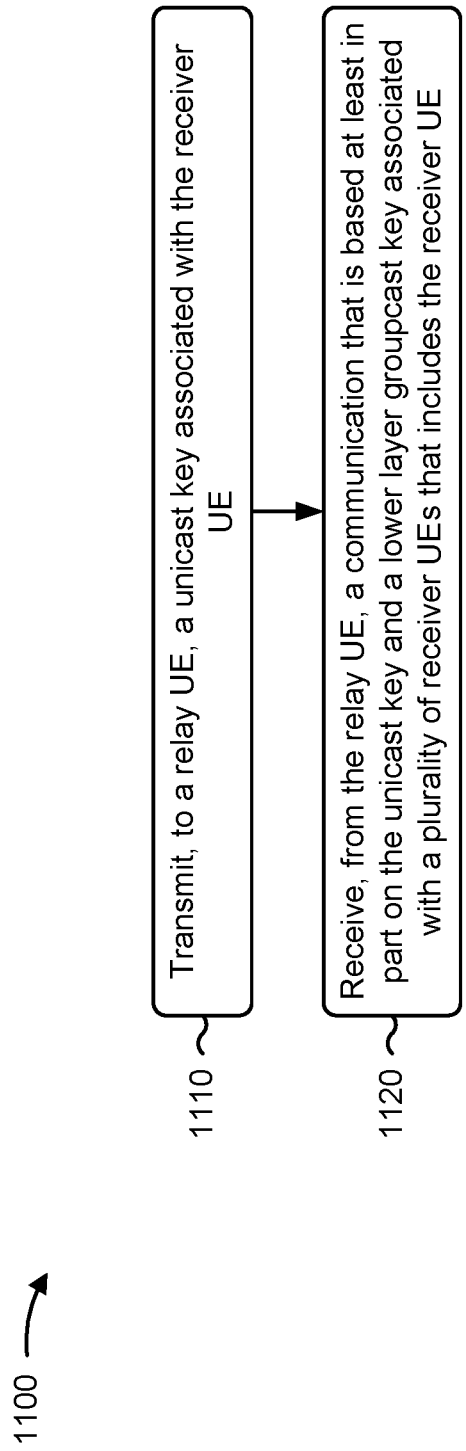
FIG. 11 is a diagram illustrating a second example process associated with lower layer key derivation with unicast connections, in accordance with the present disclosure.

FIG. 11 is a diagram illustrating an example process 1100 performed, for example, by a receiver UE, in accordance with the present disclosure. Example process 1100 is an example where the UE (e.g., the UE 120 or the receiver UE 510) performs operations associated with lower layer security for groupcast communication.

As shown in FIG. 11, in some aspects, process 1100 may include transmitting, to a relay UE, a unicast key associated with the receiver UE (block 1110). For example, the UE (e.g., using communication manager 140 and/or transmission component 1204, depicted in FIG. 12) may transmit, to a relay UE, a unicast key associated with the receiver UE, as described above.

As further shown in FIG. 11, in some aspects, process 1100 may include receiving, from the relay UE, a communication that is based at least in part on the unicast key and a lower layer groupcast key associated with a plurality of receiver UEs that includes the receiver UE (block 1120). For example, the UE (e.g., using communication manager 140 and/or reception component 1202, depicted in FIG. 12) may receive, from the relay UE, a communication that is based at least in part on the unicast key and a lower layer groupcast key associated with a plurality of receiver UEs that includes the receiver UE, as described above.

Process 1100 may include additional aspects, such as any single aspect or any combination of aspects described below and/or in connection with one or more other processes described elsewhere herein.

In a first aspect, process 1100 includes determining the lower layer groupcast key based at least in part on the unicast key.

In a second aspect, alone or in combination with the first aspect, process 1100 includes communicating with the relay UE, via a sidelink groupcast communication, using the lower layer groupcast key.

In a third aspect, alone or in combination with one or more of the first and second aspects, the lower layer groupcast key is a physical layer key, a medium access control layer key, or a radio link control layer key.

In a fourth aspect, alone or in combination with one or more of the first through third aspects, process 1100 includes receiving, from the relay UE, a communication that is based at least in part on the unicast key and a second lower layer groupcast key associated with the plurality of receiver UEs, and communicating with the relay UE using the second lower layer groupcast key.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
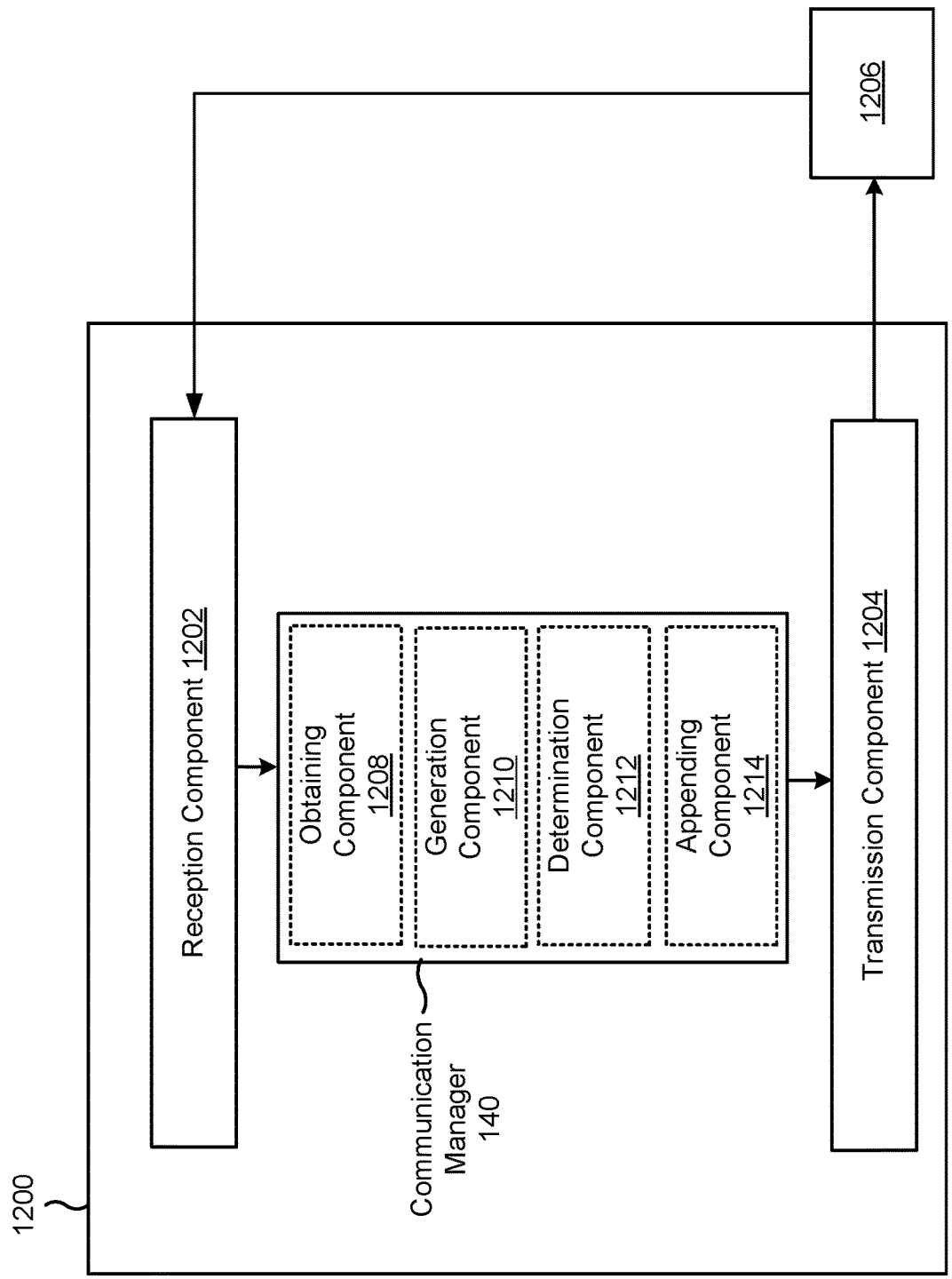
FIG. 12 is a diagram of an example apparatus for wireless communication, in accordance with the present disclosure.

FIG. 12 is a diagram of an example apparatus 1200 for wireless communication. The apparatus 1200 may be a UE, or a UE may include the apparatus 1200. The UE may be the UE 120, the relay UE 505, the receiver UE 510, the transmitter UE 515, or some combination thereof. In some aspects, the apparatus 1200 includes a reception component 1202 and a transmission component 1204, which may be in communication with one another (for example, via one or more buses and/or one or more other components). As shown, the apparatus 1200 may communicate with another apparatus 1206 (such as a UE, a base station, or another wireless communication device) using the reception component 1202 and the transmission component 1204. As further shown, the apparatus 1200 may include the communication manager 140. The communication manager 140 may include one or more of an obtaining component 1208, a generation component 1210, a determination component 1212, or an appending component 1214, among other examples.

In some aspects, the apparatus 1200 may be configured to perform one or more operations described herein in connection with FIGS. 7-8. Additionally, or alternatively, the apparatus 1200 may be configured to perform one or more processes described herein, such as process 900 of FIG. 9, process 1000 of FIG. 10, process 1100 of FIG. 11, or a combination thereof. In some aspects, the apparatus 1200 and/or one or more components shown in FIG. 12 may include one or more components of the UE described in connection with FIG. 2. Additionally, or alternatively, one or more components shown in FIG. 12 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1202 may receive communications, such as reference signals, control information, data communications, or a combination thereof, from the apparatus 1206. The reception component 1202 may provide received communications to one or more other components of the apparatus 1200. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1200. In some aspects, the reception component 1202 may include one or more antennas, a modem, a demodulator, a MIMO detector, a receive processor, a controller/processor, a memory, or a combination thereof, of the UE described in connection with FIG. 2.

The transmission component 1204 may transmit communications, such as reference signals, control information, data communications, or a combination thereof, to the apparatus 1206. In some aspects, one or more other components of the apparatus 1200 may generate communications and may provide the generated communications to the transmission component 1204 for transmission to the apparatus 1206. In some aspects, the transmission component 1204 may perform signal processing on the generated communications (such as filtering, amplification, modulation, digital-to-analog conversion, multiplexing, interleaving, mapping, or encoding, among other examples), and may transmit the processed signals to the apparatus 1206. In some aspects, the transmission component 1204 may include one or more antennas, a modem, a modulator, a transmit MIMO processor, a transmit processor, a controller/processor, a memory, or a combination thereof, of the UE described in connection with FIG. 2. In some aspects, the transmission component 1204 may be co-located with the reception component 1202 in a transceiver.

The obtaining component 1208 may obtain a common key. The reception component 1202 and/or the transmission component 1204 may communicate with one or more other UEs using a lower layer groupcast key that is based at least in part on the common key, a parameter, and at least one of a group identifier or a destination identifier.

The generation component 1210 may generate the lower layer groupcast key using a key derivation function that is based at least in part on the common key, the parameter, and at least one of the group identifier or the destination identifier.

The determination component 1212 may determine a message authentication code for a transport block. The generation component 1210 may generate an encoded transport block using the lower layer groupcast key. The appending component 1214 may append the message authentication code to the encoded transport block.

The determination component 1212 may determine a message authentication code for a PDU. The generation component 1210 may generate an encoded PDU using the lower layer groupcast key. The appending component 1214 may append the message authentication code to the encoded PDU.

The determination component 1212 may determine, using the lower layer groupcast key, that a communication is associated with the group identifier. The determination component 1212 may determine to drop the communication of the derived message authentication code associated with the communication does not match an other message authentication code received from the one or more other UEs.

The generation component 1210 may generate a second lower layer groupcast key based at least in part on detecting an indication of a man-in-the-middle attack.

The obtaining component 1208 may obtain a first unicast key, from a first receiver UE, and a second unicast key, from a second receiver UE. The transmission component 1204 may transmit, to the first receiver UE, a first communication that is based at least in part on a lower layer groupcast key and the first unicast key. The transmission component 1204 may transmit, to the second receiver UE, a second communication that is based at least in part on the lower layer groupcast key and the second unicast key.

The reception component 1202 and/or the transmission component 1204 may communicate with at least one of the first receiver UE and the second receiver UE, via a sidelink groupcast communication, using the lower layer groupcast key.

The transmission component 1204 may transmit, to the first receiver UE, a third communication that is based at least in part on a second lower layer groupcast key and the first unicast key. The transmission component 1204 may transmit, to the second receiver UE, a fourth communication that is based at least in part on the second lower layer groupcast key and the second unicast key.

The reception component 1202 and/or the transmission component 1204 may communicate with the first receiver UE and the second receiver UE using the second lower layer groupcast key.

The transmission component 1204 may transmit, to a relay UE, a unicast key associated with the receiver UE. The reception component 1202 may receive, from the relay UE, a communication that is based at least in part on the unicast key and a lower layer groupcast key associated with a plurality of receiver UEs that includes the receiver UE.

The determination component 1212 may determine the lower layer groupcast key based at least in part on the unicast key.

The reception component 1202 and/or the transmission component 1204 may communicate with the relay UE, via a sidelink groupcast communication, using the lower layer groupcast key.

The reception component 1202 may receive, from the relay UE, a communication that is based at least in part on the unicast key and a second lower layer groupcast key associated with the plurality of receiver UEs. The reception component 1202 and/or the transmission component 1204 may communicate with the relay UE using the second lower layer groupcast key.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally, or alternatively, a set of (one or more) components shown in FIG. 12 may perform one or more functions described as being performed by another set of components shown in FIG. 12.

The following provides an overview of some Aspects of the present disclosure:

Aspect 1: A method of wireless communication performed by a user equipment (UE), comprising: obtaining a common key; and communicating with one or more other UEs using a lower layer groupcast key that is based at least in part on the common key, a parameter, and at least one of a group identifier or a destination identifier.

Aspect 2: The method of Aspect 1, wherein the lower layer groupcast key is based at least in part on the common key, the parameter, and the group identifier.

Aspect 3: The method of Aspect 1, wherein the lower layer groupcast key is based at least in part on the common key, the parameter, and the destination identifier.

Aspect 4: The method of Aspect 1, wherein the lower layer groupcast key is based at least in part on the common key, the parameter, and a portion of the destination identifier.

Aspect 5: The method of any of Aspects 1-4, wherein the lower layer groupcast key is a physical layer key, a medium access control (MAC) layer key, or a radio link control (RLC) layer key.

Aspect 6: The method of any of Aspects 1-5, wherein the parameter is one of: a slot number, a frame number, or a subframe number, based at least in part on the lower layer groupcast key being a physical layer key; a medium access control (MAC) protocol data unit (PDU) count, based at least in part on the lower layer groupcast key being a MAC layer key; or a radio link control (RLC) PDU count, based at least in part on the lower layer groupcast key being an RLC layer key.

Aspect 7: The method of any of Aspects 1-6, wherein the common key is configured in the UE and the one or more other UEs, the group identifier is associated with a groupcast communication session between the UE and the one or more other UEs, and the destination identifier is a layer 2 destination identifier.

Aspect 8: The method of any of Aspects 1-7, wherein the UE does not have a unicast connection with at least one of the one or more other UEs.

Aspect 9: The method of any of Aspects 1-8, further comprising generating the lower layer groupcast key using a key derivation function that is based at least in part on the common key, the parameter, and at least one of the group identifier or the destination identifier.

Aspect 10: The method of any of Aspects 1-9, wherein communicating with the one or more other UEs comprises communicating with the one or more other UEs, via a sidelink groupcast communication, using the lower layer groupcast key.

Aspect 11: The method of any of Aspects 1-10, further comprising, at a physical layer: determining a message authentication code for a transport block; generating an encoded transport block using the lower layer groupcast key; and appending the message authentication code to the encoded transport block.

Aspect 12: The method of any of Aspects 1-10, further comprising, at a radio link control layer or a medium access control layer: determining a message authentication code for a protocol data unit (PDU); generating an encoded PDU using the lower layer groupcast key; and appending the message authentication code to the encoded PDU.

Aspect 13: The method of any of Aspects 1-12, further comprising: determining, using the lower layer groupcast key, that a communication is associated with the group identifier; and if a physical layer integrity protection is enabled, performing a transport block level derivation of a message authentication code associated with the communication; or if a radio link control integrity protection or a medium access control integrity protection is enabled, performing protocol data unit level derivation of the message authentication code associated with the communication. if a physical layer integrity protection is enabled, performing a transport block level derivation of a message authentication code associated with the communication; or if a radio link control integrity protection or a medium access control integrity protection is enabled, performing protocol data unit level derivation of the message authentication code associated with the communication.

Aspect 14: The method of Aspect 13, further comprising determining to drop the communication of the derived message authentication code associated with the communication does not match an other message authentication code received from the one or more other UEs.

Aspect 15: The method of any of Aspects 1-14, further comprising generating a second lower layer groupcast key based at least in part on detecting an indication of a man-in-the-middle attack.

Aspect 16: A method of wireless communication performed by a relay user equipment (UE), comprising: obtaining a first unicast key, from a first receiver UE, and a second unicast key, from a second receiver UE; transmitting, to the first receiver UE, a first communication that is based at least in part on a lower layer groupcast key and the first unicast key; and transmitting, to the second receiver UE, a second communication that is based at least in part on the lower layer groupcast key and the second unicast key.

Aspect 17: The method of Aspect 16, further comprising communicating with at least one of the first receiver UE and the second receiver UE, via a sidelink groupcast communication, using the lower layer groupcast key.

Aspect 18: The method of any of Aspects 16-17, wherein the first communication is a logical combination of the lower layer groupcast key and the first unicast key, and the second communication is a logical combination of the lower layer groupcast key and the second unicast key.

Aspect 19: The method of any of Aspects 16-18, wherein the lower layer groupcast key is a physical layer key, a medium access control layer key, or a radio link control layer key.

Aspect 20: The method of any of Aspects 16-19, further comprising: transmitting, to the first receiver UE, a third communication that is based at least in part on a second lower layer groupcast key and the first unicast key; transmitting, to the second receiver UE, a fourth communication that is based at least in part on the second lower layer groupcast key and the second unicast key; and communicating with the first receiver UE and the second receiver UE using the second lower layer groupcast key.

Aspect 21: The method of any of Aspects 16-20, wherein obtaining the first unicast key comprises exchanging a certificate with the first receiver UE, and obtaining the second unicast key comprises exchanging a certificate with the second receiver UE.

Aspect 22: A method of wireless communication performed by a receiver user equipment (UE), comprising: transmitting, to a relay UE, a unicast key associated with the receiver UE; and receiving, from the relay UE, a communication that is based at least in part on the unicast key and a lower layer groupcast key associated with a plurality of receiver UEs that includes the receiver UE.

Aspect 23: The method of Aspect 22, further comprising determining the lower layer groupcast key based at least in part on the unicast key.

Aspect 24: The method of any of Aspects 22-23, further comprising communicating with the relay UE, via a sidelink groupcast communication, using the lower layer groupcast key.

Aspect 25: The method of any of Aspects 22-24, wherein the lower layer groupcast key is a physical layer key, a medium access control layer key, or a radio link control layer key.

Aspect 26: The method of any of Aspects 22-25, further comprising: receiving, from the relay UE, a communication that is based at least in part on the unicast key and a second lower layer groupcast key associated with the plurality of receiver UEs; and communicating with the relay UE using the second lower layer groupcast key.

Aspect 27: An apparatus for wireless communication at a device, comprising a processor; memory coupled with the processor; and instructions stored in the memory and executable by the processor to cause the apparatus to perform the method of one or more of Aspects 1-15.

Aspect 28: A device for wireless communication, comprising a memory and one or more processors coupled to the memory, the one or more processors configured to perform the method of one or more of Aspects 1-15.

Aspect 29: An apparatus for wireless communication, comprising at least one means for performing the method of one or more of Aspects 1-15.

Aspect 30: A non-transitory computer-readable medium storing code for wireless communication, the code comprising instructions executable by a processor to perform the method of one or more of Aspects 1-15.

Aspect 31: A non-transitory computer-readable medium storing a set of instructions for wireless communication, the set of instructions comprising one or more instructions that, when executed by one or more processors of a device, cause the device to perform the method of one or more of Aspects 1-15.

Aspect 32: An apparatus for wireless communication at a device, comprising a processor; memory coupled with the processor; and instructions stored in the memory and executable by the processor to cause the apparatus to perform the method of one or more of Aspects 16-21.

Aspect 33: A device for wireless communication, comprising a memory and one or more processors coupled to the memory, the one or more processors configured to perform the method of one or more of Aspects 16-21.

Aspect 34: An apparatus for wireless communication, comprising at least one means for performing the method of one or more of Aspects 16-21.

Aspect 35: A non-transitory computer-readable medium storing code for wireless communication, the code comprising instructions executable by a processor to perform the method of one or more of Aspects 16-21.

Aspect 36: A non-transitory computer-readable medium storing a set of instructions for wireless communication, the set of instructions comprising one or more instructions that, when executed by one or more processors of a device, cause the device to perform the method of one or more of Aspects 16-21.

Aspect 37: An apparatus for wireless communication at a device, comprising a processor; memory coupled with the processor; and instructions stored in the memory and executable by the processor to cause the apparatus to perform the method of one or more of Aspects 22-26.

Aspect 38: A device for wireless communication, comprising a memory and one or more processors coupled to the memory, the one or more processors configured to perform the method of one or more of Aspects 22-26.

Aspect 39: An apparatus for wireless communication, comprising at least one means for performing the method of one or more of Aspects 22-26.

Aspect 40: A non-transitory computer-readable medium storing code for wireless communication, the code comprising instructions executable by a processor to perform the method of one or more of Aspects 22-26.

Aspect 41: A non-transitory computer-readable medium storing a set of instructions for wireless communication, the set of instructions comprising one or more instructions that, when executed by one or more processors of a device, cause the device to perform the method of one or more of Aspects 22-26.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a user equipment (UE), comprising:
   one or more memories; and
   one or more processors, coupled to the one or more memories, configured to:
      obtain a common key that is configured in the UE at a time of manufacture; and
      communicate with one or more other UEs using a layer 2 (L2) groupcast key that is based at least in part on the common key, a parameter, and a first eight bits of a destination identifier, wherein the parameter is based at least in part on a layer at which the L2 groupcast key is derived.

2. The apparatus of claim 1, wherein the L2 groupcast key is based at least in part on the common key, the parameter, and a group identifier.

3. The apparatus of claim 1, wherein the L2 groupcast key is based at least in part on the common key, the parameter, and the first eight bits of the destination identifier.

4. The apparatus of claim 1, wherein the destination identifier is a 24-bit L2 destination identifier.

5. The apparatus of claim 1, wherein the L2 groupcast key is a physical layer key, a medium access control (MAC) layer key, or a radio link control (RLC) layer key.

6. The apparatus of claim 1, wherein the parameter is one of:
a slot number, a frame number, or a subframe number, based at least in part on the L2 groupcast key being a physical layer key;
a medium access control (MAC) protocol data unit (PDU) count, based at least in part on the L2 groupcast key being a MAC layer key; or
a radio link control (RLC) PDU count, based at least in part on the L2 groupcast key being an RLC layer key.

7. The apparatus of claim 1, wherein the UE is a relay UE, the common key is configured in the UE and the one or more other UEs,
a group identifier is associated with a groupcast communication session between the UE and the one or more other UEs, and
the destination identifier is an L2 destination identifier.

8. The apparatus of claim 1, wherein the UE does not have a unicast connection with at least one of the one or more other UEs.

9. The apparatus of claim 1, wherein the one or more processors are further configured to generate the L2 groupcast key using a key derivation function that is based at least in part on the common key, the parameter, and at least one of a group identifier or the destination identifier.

10. The apparatus of claim 1, wherein the one or more processors are configured to communicate with the one or more other UEs, via a sidelink groupcast communication, using the L2 groupcast key.

11. The apparatus of claim 1, wherein the one or more processors are further configured to, at a physical layer:
determine a message authentication code for a transport block;
generate an encoded transport block using the L2 groupcast key; and
append the message authentication code to the encoded transport block.

12. The apparatus of claim 1, wherein the one or more processors are further configured to, at a radio link control layer or a medium access control layer:
determine a message authentication code for a protocol data unit (PDU);
generate an encoded PDU using the L2 groupcast key; and
append the message authentication code to the encoded PDU.

13. The apparatus of claim 1, wherein the one or more processors are further configured to:
determine, using the L2 groupcast key, that a communication is associated with a group identifier; and
if a physical layer integrity protection is enabled, perform a transport block level derivation of a message authentication code associated with the communication; or if a radio link control integrity protection or a medium access control integrity protection is enabled, perform protocol data unit level derivation of the message authentication code associated with the communication.

14. The apparatus of claim 13, wherein the one or more processors are further configured to determine to drop the communication if the derived message authentication code associated with the communication does not match another message authentication code received from the one or more other UEs.

15. The apparatus of claim 1, wherein the one or more processors are further configured to generate a second L2 groupcast key based at least in part on detecting an indication of a man-in-the-middle attack.

16. The apparatus of claim 1, wherein the L2 groupcast key is based at least in part on the first eight bits of the destination identifier, and
wherein the destination identifier is a 24-bit L2 destination identifier.

17. A method of wireless communication performed by a user equipment (UE), comprising:
obtaining a common key that is configured in the UE at a time of manufacture; and
communicating with one or more other UEs using a layer 2 (L2) groupcast key that is based at least in part on the common key, a parameter, and a first eight bits of a destination identifier, wherein the parameter is based at least in part on a layer at which the L2 groupcast key is derived.

18. The method of claim 17, wherein the L2 groupcast key is based at least in part on the common key, the parameter, and a group identifier.

19. The method of claim 17, wherein the L2 groupcast key is based at least in part on the common key, the parameter, and the first eight bits of the destination identifier.

20. The method of claim 17, wherein the destination identifier is a 24-bit L2 destination identifier.

21. The method of claim 17, wherein the L2 groupcast key is a physical layer key, a medium access control (MAC) layer key, or a radio link control (RLC) layer key.

22. The method of claim 17, wherein the parameter is one of:
a slot number, a frame number, or a subframe number, based at least in part on the L2 groupcast key being a physical layer key;
a medium access control (MAC) protocol data unit (PDU) count, based at least in part on the L2 groupcast key being a MAC layer key; or
a radio link control (RLC) PDU count, based at least in part on the L2 groupcast key being an RLC layer key.

23. The method of claim 17, wherein
the UE is a relay UE,
the common key is configured in the UE and the one or more other UEs,
a group identifier is associated with a groupcast communication session between the UE and the one or more other UEs, and
the destination identifier is an L2 destination identifier.

24. The method of claim 17, wherein the UE does not have a unicast connection with at least one of the one or more other UEs.

25. The method of claim 17, further comprising:
generating the L2 groupcast key using a key derivation function that is based at least in part on the common key, the parameter, and at least one of a group identifier or the destination identifier.

26. The method of claim 17, further comprising:
communicating with the one or more other UEs, via a sidelink groupcast communication, using the L2 groupcast key.

27. A non-transitory computer-readable medium storing a set of instructions for wireless communication, the set of instructions comprising:
one or more instructions that, when executed by one or more processors of a user equipment (UE), cause the UE to:
obtain a common key that is configured in the UE at a time of manufacture; and
communicate with one or more other UEs using a layer 2 (L2) groupcast key that is based at least in part on the common key, a parameter, and a first eight bits of a destination identifier, wherein the parameter is based at least in part on a layer at which the L2 groupcast key is derived.

28. The non-transitory computer-readable medium of claim 27, wherein the L2 groupcast key is based at least in part on the common key, the parameter, and a group identifier.

29. An apparatus for wireless communication, comprising:
means, comprising one or more hardware processors, for obtaining a common key that is configured in the apparatus at a time of manufacture; and
means, comprising the one or more hardware processors, for communicating with one or more other apparatuses using a layer 2 (L2) groupcast key that is based at least in part on the common key, a parameter, and a first eight bits of a destination identifier, wherein the parameter is based at least in part on a layer at which the L2 groupcast key is derived.

30. The apparatus of claim 29, wherein the L2 groupcast key is based at least in part on the common key, the parameter, and a group identifier.

* * * * *